US006357845B1

(12) United States Patent
Kuwabara et al.

(10) Patent No.: US 6,357,845 B1
(45) Date of Patent: Mar. 19, 2002

(54) LEATHER COLORING PROCESS, LEATHER COLORING APPARATUS AND COLORED LEATHER PRODUCED BY SUCH PROCESS

(75) Inventors: Nobuyuki Kuwabara, Kawasaki; Tokuya Ohta, Yokohama; Yasushi Takatori, Sagamihara; Sadayuki Sugama, Tsukuba; Hiromitsu Hirabayashi; Yuji Akiyama, both of Yokohama; Miyuki Fujita, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/310,129

(22) Filed: May 12, 1999

Related U.S. Application Data

(62) Division of application No. 08/884,464, filed on Jun. 27, 1997, now Pat. No. 6,022,383.

(30) Foreign Application Priority Data

Feb. 4, 1994 (JP) ........................................... 6-012767
Oct. 12, 1994 (JP) ........................................... 6-246191
Jan. 31, 1995 (JP) ........................................... 7-013885

(51) Int. Cl.[7] ............................................... H04N 1/034
(52) U.S. Cl. .......................................... 347/3; 347/105
(58) Field of Search ........................... 347/3, 101, 105; 8/436, 94.2, 930

(56) References Cited

U.S. PATENT DOCUMENTS 4,333,731 A 6/1982 Schindlmayr .................. 8/436
4,538,160 A * 8/1985 Uchiyama ................... 347/101
4,592,756 A 6/1986 Kawasaki et al. ............. 8/437
4,680,058 A 7/1987 Shimizu et al. ............... 106/23
4,810,006 A 3/1989 Katz ............................ 281/5
4,836,827 A 6/1989 Pütener ......................... 8/437
4,932,978 A 6/1990 Gavend et al. ................ 8/436
5,002,586 A 3/1991 Dien et al. ...................... 8/436
5,048,455 A 9/1991 Gavend et al. ................ 8/436
5,059,682 A 10/1991 Schaulin ..................... 534/702
5,120,601 A 6/1992 Kotaki et al. ............... 428/327
5,411,556 A 5/1995 Dix et al. ...................... 8/436
5,766,398 A 6/1998 Cahill et al. ................ 156/240

FOREIGN PATENT DOCUMENTS

EP 0655527 5/1995 .......... D06P/1/100

* cited by examiner

*Primary Examiner*—N. Le
*Assistant Examiner*—Shih-wen Hsieh
(74) *Attorney, Agent, or Firm*—Fitzpatrick, Cella, Harper & Scinto

(57) ABSTRACT

A leather coloring process for carrying out coloring on a natural leather, or a natural leather which has been subjected to degreasing. The coloring process is accomplished by ink-jet coloring on at least a partial area of the natural leather.

6 Claims, 16 Drawing Sheets

LEATHER COLORING PROCESS, LEATHER COLORING APPARATUS AND COLORED LEATHER PRODUCED BY SUCH PROCESS

This appln is a div of Ser. No. 08/884,464 filed Jun. 27, 1997 now U.S. Pat. No. 6,022,383.

BACKGROUND OF THE INVENTION

1. Field of the Invention

This invention relates to a coloring apparatus and process, such as a dyeing or printing process for a leather. More particularly, the present invention relates to a leather coloring process, and a leather coloring apparatus, that enables highly minute image formation on leather by a simple and high-speed operation.

In addition to the above, the present invention also relates to a coloring treatment process attaining a simplification for various finishing processes, and a coloring treatment apparatus thereof, as well as also relating to a leather produced after such leather coloring and a leather product obtained by processing the leather.

2. Related Background Art

Leathers are commonly produced according to the following processes. First, raw hide or skin obtained by skinning animals is subjected to a preliminary, beamhouse process comprised of soaking, fleshing, unhairing, liming, splitting, scudding, washing, re-liming, deliming and bating subsequently to a tanning process to carry out tanning by the use of a tanning agent of various types such as chromium compounds and vegetable tannin in order to impart softness and thermal resistance to the hide or skin, and thereafter a dyeing and fatliquoring process comprised of neutralizing, dyeing and fatliquoring (or stuffing), finally followed by a finishing process comprised of sammying, setting-out, drying, conditioning, staking, stretch drying, trimming, grain correcting, coating, and measuring, where durability, fastness and the like are improved. Having been subjected to these processes, leather products are obtained as final products.

Leather products are utilized in a great variety of fields, making the most of the handle (or hand) inherent in leathers. For example, they are utilized in a vast range of footware such as shoes, clothes, personal ornaments such as gloves and belts, traveling goods such as bags, trunks (or suitcases) and purses, industrial parts such as belts and gaskets, and furniture such as chairs and automobile seat sheets, as well as horse gear, musical instruments, kendo (Japanese style fencing) goods, and so forth. In such respective fields, hide or skin of various animals and various tanning methods are used. For such uses, hitherto in addition to dyeing the hide or skin in specified color in whole, at a finishing step, varieties in surface shapes as in embossing leather and suede are provided to make these types of leather products abundant and to exhibit a high-grade quality.

Under such circumstances, the coloring on leather by conventional dyeing or coating is carried out using dyes or pigments. Almost all of these coloring materials are those employed from dyes or pigments hitherto used in the dyeing of textiles, and coloring processes suitably selected according to the kind of raw hide or skin, the manner of tanning and the type of use. For example, there are processes such as battick dyeing, dip dyeing and textile printing.

Under actual circumstances, however, since the leather has various properties according to its kind, actual operation still largely depends on experience. Even when the leather is colored in monochrome, the coloring on some kinds of leathers takes a long time for its operation, requires complicated operation steps, or makes it necessary to repeat the same step many times. Hence, it has been very difficult to mass-produce dyed products of the same design or to dye leather to form highly minute images or multi-color images.

Meanwhile, the surface of leather, in particular, what is called the grain side of natural leather has irregularities or large concavities because of follicle mouths (pores of the skin) or various wrinkles originally present in raw hide or skin. If the leather is dyed in that state, dyeing agents may conspicuously gather to that part to cause highly deep-colored portions. Also when the leather is dyed after it has been smoothened to eliminate irregularities or large concavities in treating steps, it is difficult to perfectly smooth the surface, so that the leather may be non-uniformly colored or non-colored at the first operation. To overcome such disadvantages, it is often necessary to reform many steps or to repeat the operation of dyeing and rinsing several times. Namely, it is difficult to obtain the desired state of dyeing and the desired color tones. As a result, it tends to provide only leather products with varied color tones.

On the contrary, in the general trends of wanting to have products with a sense of high grade in everyday living goods and ornaments, leather products can also more highly enjoy the sense of high grade inherent in leather if products with highly minute images formed on the surface can be readily obtained, and also it is possible to intend an application of leather products in a wider range if it becomes possible to form multi-color images or to carry out partial printing on leathers with ease.

However, as previously stated, the hitherto known dyeing and coating processes require a large number of steps and hence take a long time for their operation, in order to maintain color density and fastness. Moreover, leathers are hitherto mostly dyed in monochrome, and hence, in order to represent multi-color images on leather, it has been necessary to stick or stitch sheet by sheet a plurality of leathers dyed in different colors. There has been also a limit in number even if some kinds of colors can be represented on the same leather. At any event, the manner of dyeing or coating may often differ for each color and also the dyeing or coating has been manually operated in many instances, so that the experience of the one performing the dyeing or coating process is a great factor which, shows in the final product. Thus, in the past, the dyeing on leathers has been mostly supported by know-how, and hence it has been difficult to automate the operation, resulting in a high cost.

Thus, it will be complicated in processes and high in cost to express minute image and multi-color image and further to make a partial image formation only by improving conventional dyeing methods.

SUMMARY OF THE INVENTION

The present invention was made taking account of the above problems in the prior art. An object thereof is to provide a process that makes it possible to color on leathers at a low cost and also through simple steps, and to produce highly minute images, multi-color images or partial dyeings and the like on leathers.

An ink-jet method is therefore proposed.

What is meant by "coloring" (leather coloring) generally embraces terms such as dyeing, coating and coloring in monochromes and multi-colors as hitherto commonly used as technical terms. Hence, it includes all modes such as a mode wherein, after the leather coloring, coloring materials serving as color sources have permeated in the inside of leather, a mode wherein they have adhered to, or partly permeated in, only the surface layer of leather or in the vicinity thereof and a mode wherein they are superimposed in layers on the surface of leather.

An ink-jet system is used to provide an image formation with integration of dots by moving an ink-jet head integrally arranged with a plurality of orifices according to a desired image signal and by ejecting ink as droplets containing a coloring material from the orifices. Accordingly, it is very effective for attaining objects for obtaining high precise images, multi-color images and partial colorings, by making an orifice density in arranging high or ejecting inks of different colors from a plurality of ink-jet heads. It is enough of an invention to attain the object to apply the ink-jet system to the coloration of leather. However, it has become clear that some further specified technical subjects occur in a combination of a leather and an ink-jet coloration, in the course of study on attaining a high level image with the ink-jet system.

Namely, the first one of these specified technical subjects is that a water resistance in high level is required. Even a case of performing an ink-jet coloration to leather, high fastness for subsequent steps is necessary and further a conventional finishing step is also necessary. The finishing step is for an object to protect a leather surface, as well as to provide a beautiful appearance. Among them, in particular, impregnating and film forming materials using water as a solvent or a dispersing agent are often utilized as a pretreatment step for coating and base and inter coating steps. Consequently, after the formation of multi-color images by an ink-jet coloring, many chances to directly contact the images with water will occur, even if there is a fatliquoring step. A conventional dyeing operation includes dipping a whole leather in a dyeing bath containing a dye and water, to keep a larger amount of dye in the leather than a dyeing amount which the leather can contain, and then to wash out an undyed dye by means of a washing step, by which no hinderance has occurred in a finish coating step. On the contrary, in a case of carrying out an ink-jet coloring on leather, it is difficult to use a coloring material over a necessary amount and wash out an undyed dye because of bleeding between colors, a balance of color density and the like. Although a dyeing acceleration agent has been conventionally used, it is not effective in this case, because it is objected to mainly for keeping a dyeablity after washing. Therefore, in formation of high precise and multi-color images, a technical subject that a coloring material in a formed image will be dissolved into water in a finish coating solution will occur to deteriorate a image quality in case of utilizing a conventional finishing step, unless a water resistance in consideration of a point different hitherfrom is added.

The second one of these specified technical subjects is that it is necessary to suppress a change of color density depending on a deviation of penetration or expansion of a coloring ink when especially high level images are stably formed on a specified part of area or leather. An ink-jet coloring has an advantage to perform coloring on a part of leather more easily than a conventional method. However, it has been found that as each dot to be colored on leather is finer, a weight thereof to decide a quality of images is increased depending on a behavior of each dot on leather, i.e., a penetration of an ink in the direction of thickness or an expansion of an ink on a surface. Dyeing on a leather can be discussed based on dyeing sites capable of bonding with a coloring material similar to dyeing on a cloth, and it is said that the dyeing sites in a leather are much more different than that in a cloth. However, it has been also found that, in a case of leather made up by changing properties with a variety of treating steps, keeping a form of natural hide or skin taken from an animal, which is different from a processed textile such as a cloth, distribution conditions of the dyeing sites at surface and inside of leather are recognized to be uneven. It has further been found out that it becomes difficult to obtain uniform images with an ink-jet coloring, because a distribution conditions of the dyeing sites differ, when a portion of animal body differs. In a conventional method, countermeasures of increasing an amount of dye, elongation of a dyeing time or re-dyeing have been taken. However, it is not preferable in an ink-jet coloring to apply such similar procedures, because there is a high possibility of bleeding between colors or loosing of a balance of each color. Namely, it is a very important technical subject to make images stabler in either cases of mono-chrome or multi-color that penetration conditions or a deviation of expansion of each dot on leather is suppressed and that a deviation of color density depending on a difference of penetration conditions of a coloring ink or a disorder of dot form depending on a difference of expansion of droplets is prevented.

The third one of these specified technical subject is that, even if high level images can be obtained by an ink-jet coloring, it does not contribute to efficiency of a whole process to merely replace conventional steps. As described above, there are many steps from a raw hide to a leather product. Among them, a coating step is used for improving a sense of beauty or making a durability to a leather having been provided with a handle or a form after dyeing is finished, and a coating agent is commonly liquid. However, it is necessary to take much care for coating agents depending on a made up condition of leather, and then there may be a case to prepare a specified coating agent in advance. Although mechanization in steps of a blow coating, a curtain coating, a roll coating and so forth is considerably proceeded, there are many steps to require man power in moving leather, attaching a leather to a coating apparatus and so on, during a transfer from dyeing to coating steps, since a dyeing apparatus and a coating apparatus are separate. In particular, it is difficult to attach a leather automatically since a shape of leather is not regulated. Thus, it is very difficult to perform a continuous operation throughout a coloring step to a coating step utilizing a conventional procedure. As a result, a problem may occur in that it takes much time to perform these treatments. Consequently, it is important to solve problems of this working time in a mass production or a limited production of many kinds of products. Also a problem of waste material of dyeing and of heat source for drying arising from a dip dyeing procedure cannot be negligible. Accordingly, it is a technical subject that may become a hinderance in maintaining image quality and in cost to conduct an image forming on a leather by an ink-jet system. Thus, the present invention is to attain high precise images, multi-color images, dyeing in a part to a leather which are problems incapable to attain by a conventional method, as well as to solve a specified technical subject occurring therein at the same time.

Accordingly, the main object of the present invention is to carry out coloring on a leather rapidly and inexpensively, and in addition to the above, as a specified object, first to attain a water resistance, and second to attain formation of high precise images excellent in fastness by stabilizing penetration and bleeding conditions of a coloring solution, and third to enable continuous operation and automation for treatments after image formation to leather, and an apparatus to attain the object mentioned above as well as a leather product made thereby.

The objects mentioned above can be achieved by the present invention.

As a first embodiment, the present invention basically provides a leather coloring process for carrying out coloring on a natural leather or a natural leather having been subjected to degreasing, the process comprising the step of carrying out ink-jet coloring on at least a partial area of the natural leather.

As another mode of the first embodiment, the present invention also provides an ink-jet leather coloring apparatus comprising a means for changing the quantity of ink, when ink-jetted according to printing signals, in accordance with the type of a natural leather to be subjected to leather coloring; an ink-jet means; and a transport means for transporting the natural leather to a coloring zone of the ink-jet means in the state of non-contact with the ink-jet means.

As a still another mode of the first embodiment, the present invention provides a leather or leather product on which ink-jet leather coloring has been carried out by the process of the first embodiment as described above.

As a second embodiment, the present invention basically provides a leather coloring process having the step of coloring an image on a natural leather having been subjected to tanning, the process comprising;

a jet coloring step of jetting to the leather a liquid ink containing a coloring material, in the form of droplets corresponding with given information to carry out coloring; and a permeation step of imparting to the leather a coloring material fixing agent capable of reacting with the coloring material of the liquid ink jetted in the form of droplets and permeable in the leather, to cause the latter to permeate into the former.

As another mode of the second embodiment, the present invention provides a leather or leather product on which ink-jet leather coloring has been carried out by the process of the second embodiment as described above.

As a third embodiment, the present invention basically provides a leather coloring process for forming an image on a leather by coloring, the process comprising;

a prior step of imparting to the surface of the leather an ink permeation controlling agent capable of reacting with a coloring material of an ink, at least at its area to which the image is to be formed by coloring;

a coloring step of coloring the image on the surface of the leather by an ink-jet means, at least at its area to which the ink permeation controlling agent has been imparted; and a posterior step of imparting to the surface of the leather an image controlling agent capable of reacting with the coloring material of the ink in the leather, at least at its area to which the image has been colored by the ink-jet means.

As another mode of the third embodiment, the present invention also provides an apparatus for carrying out the leather coloring process described above, the apparatus comprising an ink-jet means for carrying out coloring on a leather to form an image on the leather, and a modifying means for imparting to the leather an image modifying agent capable of substantially modifying the image by the ink-jet means.

As a still another mode of the first embodiment, the present invention provides a leather or leather product on which ink-jet leather coloring has been carried out by the process described above.

Other preferred modes, features and embodiments of the present invention will become apparent from the following description.

DESCRIPTION OF THE PREFERRED EMBODIMENTS

First Embodiment

Figure 1:
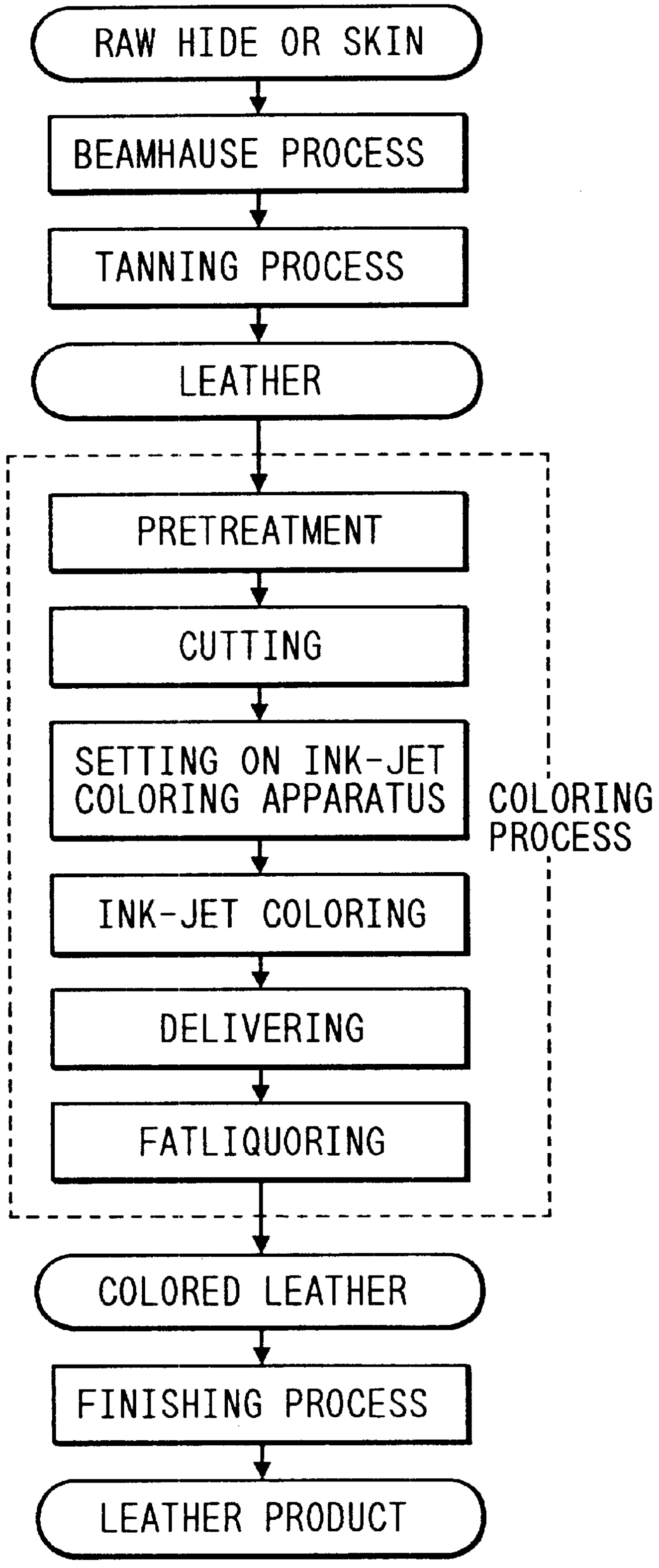
FIG. 1 illustrates a procedure for leather treatment carried out in Example 1 of the present invention.

In a representative mode in the first embodiment of the present invention according to the main object described above, the invention is a leather coloring process for carrying out coloring on a natural leather or a natural leather having been subjected to degreasing, the process comprising the step of carrying out ink-jet coloring on a partial area of the natural leather. According to the present invention, the problems in conventional leather dyeing processes can be all settled, where the partial area can be brought into the desired colored state to carry out partial multi-color coloring. Of course, the present invention may be applied to the whole leather to carry out the ink-jet coloring on the whole area. Such application of the present invention is not denied.

In another representative mode in the first embodiment of the present invention, the invention is a leather coloring process comprising the step of carrying out ink-jet coloring on a natural leather having been degreased in part or degreased to a low level, at its area having been degreased in part or degreased to a low level. According to the present invention, there is an advantage that the ink-jet leather coloring can be carried out at a high efficiency. In particular, the area having been degreased to a low level is advantageous in that the coloring can be carried out in a short time in view of the recovery of the state of leather.

In a still another representative mode in the first embodiment of the present invention, the invention is a leather coloring process comprising the step of carrying out ink-jet coloring on a natural leather having been degreased in part or degreased to a low level, at its area having been degreased in part or degreased to a low level, after an ink receiving layer has been formed. According to the present invention, the presence of the ink receiving layer enables overall achievement of the dyeing of the leather itself and the dyeing in a high density, and the ink receiving layer itself can be fixed to the leather. Hence, the whole leather can be made to have a higher quality. As a still another representative mode in the first embodiment, the present invention having such a characteristic feature is a leather coloring process for carrying out coloring on a natural leather or a natural leather having been subjected to degreasing, the process comprising the step of carrying out ink-jet coloring on a partial area of the natural leather in which an ink receiving layer has been formed. Namely, providing a natural leather on which the ink receiving layer has been formed is in itself more preferable as the present invention. Such a leather coloring process is a more practical invention.

As a more advanced mode in the first embodiment of the present invention, the invention is a leather coloring process for carrying out coloring on a natural leather or a natural leather having been subjected to degreasing, the process comprising the step of carrying out ink-jet coloring on the natural leather, having been heated to a temperature of 60° C. or below. According to the present invention, the leather coloring can be in a good efficiency without causing deterioration of the leather itself by heat. In this case, the ink-jet coloring may be carried out by the "bubble jet" system, proposed by Canon Inc., which utilizes film boiling, where, although the ink is heated, the ink reaches to the leather in the state of 60° C. or below (57° C. to 58° C.) and hence the leather coloring can be in a more improved state.

A practical mode of the apparatus in the first embodiment of the present invention, the invention is an ink-jet leather coloring apparatus comprising a means for changing the quantity of ink, when ink-jetted according to coloring signals, in accordance with the type of a natural leather to be subjected to leather coloring; an ink-jet means; and a transport means for transporting the natural leather to a coloring zone of the ink-jet means in the state of non-contact with the ink-jet means. According to the present invention, in addition to the invention concerning the process, the quantity of the ink imparted to leather can be changed to an appropriate quantity, and hence the leather coloring can be in a more improved state.

As an improved mode of the invention concerning the apparatus, which can achieve automation and multi-color coloring, the present invention is an ink-jet leather coloring apparatus comprising a host computer which outputs multi-color information necessary for leather coloring on a natural leather; a multi-color ink-jet means; a means for changing the quantity of ink, when ink-jetted according to multi-color coloring signals, in accordance with the type of a natural leather to be subjected to leather coloring; and a transport means for transporting the natural leather to a coloring zone of the ink-jet means in the state of non-contact with the ink-jet means.

The present invention is by no means limited to the invention described above, and may include any intermediate products and final products obtained by the invention described above. The present invention may also include any desired functional combination of the invention described above, and an ink-jet leather coloring system having the steps of ink-jet coloring on leather, drying, and up to fatliquoring by ink-jet means.

The leather referred to in the present invention chiefly means a natural leather, obtained by unhairing a hide or skin, followed by tanning. The raw hides or skins serving as starting materials are utilized as by-products after animals have been treated for removal of flesh, and hence those commonly available in a large quantity are hides or skins of mammals such as bovines, pigs, horses, goats, sheep and deers. Besides, skins of birds such as ostriches and the reptiles such as sea turtles, giant lizards, pythons and crocodiles are also used as leathers. The present invention by no means place limitations among these. With regard to tanning methods also, there are various methods in those having been hitherto employed, from which suitable tanning methods are selected according to the form and purpose of products obtained as final leather products. As the tanning methods, those prevalent at present are chrome tanning and vegetable tanning. In addition to these, various methods as described below are available.

The tanning methods are first roughly grouped into methods making use of inorganic type mineral tanning agents, as typified by the chrome tanning, methods making use of organic type vegetable or synthetic tanning agents, as typified by the vegetable tanning, and methods making use of fat and oil type tanning agents. Besides, combination tanning carried out in combination of some of these tanning methods are widely used at present.

Among the above tanning methods, the methods making use of mineral tanning agents include chrome tanning, aluminum tanning, zirconium tanning, titanium tanning and ferric salt tanning. The methods making use of organic type tanning agents include vegetable tanning and aldehyde tanning. The methods also include tanning making use of synthetic tanning agents such as naphthalene type synthetic tanning agents, phenol type synthetic tanning agents and resin tanning agents, and fat and oil tanning as typified by Chamois leather.

Now, in the ink-jet system as the ink-jet means used in the present invention, images are constituted of dots densely divided into 300 dpi, 360 dpi or much more 600 dpi, and these individual dots can be caused to impact against the natural leather serving as a medium, in the form of colored droplets jetted from minute nozzles, and hence coloring per dot can be sharply carried out. Moreover, a uniform color tone can be obtained, and hence it is possible to obtain uniform images as a whole. Also, since the ink-jet coloring system is a coloring system to carry out the coloring in non-contact with the medium, it is not always necessary to keep strict uniformity in the smoothness of the surface of leather and in the support on the back of leather, and also plural colors of droplets can be made to adhere in one step, so that the time for leather treatment subsequently carried out can also be greatly shortened.

In the ink-jet coloring system, the leather coloring is carried out while a plurality of nozzle arrays of the ink-jet means are moved in a relative fashion with respect to the leather at the same time with ink jetting, where the dot density can be made higher and the sharpness of leather colored areas can be improved. Moreover, according to the present invention, on account of the ink-jet system, the images or marks in monochromes or composite colors to be formed by ink jet can be formed in specific colors only in specific partial areas on the leather surface, and hence the partial specific areas can be formed as emphasized areas or color-softened areas. In particular, the step of pretreatment applied only to the partial specific areas can be made different using a mask or the like, whereby the ink-jet leather colored areas can be more emphasized. As an additional advantage in the ink-jet leather coloring on the leather surface, even when non-smooth portions such as follicle mouths and wrinkles are present on the leather surface, the quantity of ink jet can be controlled only at those portions so that neither non-uniform coloring nor non-coloring may occur in relation to other portions (smooth portions or peripheral areas). If, on the other hand, the leather surface is uniform, the quantity of ink to be imparted can be adjusted or changed by programming or by image processing on a host computer of the system, whereby the desired density distribution or gradation can be obtained and the disadvantages in the conventional leather printing can be completely eliminated.

The ink-jet system mentioned above hitherto applied to recording on a plain paper. However, when recording is carried out using plain paper, the maximum shot-in ink quantity is limited in view of decrease in resolution, bleeding (between colors), strike-through, increase in fixing time and so forth. Hence, in usual instances, the maximum shot-in ink quantity is commonly so designed as to be within the range of from 16 to 28 nl/mm$^2$ in the case of water-based inks. However, in the case of the leather coloring process as in the present invention, there may be a preferable case to impart ink in a larger quantity, depending on a sort of origin animals or conditions of tanning. Numerically stated, the shot-in ink quantity is twice or more than usual cases, and about 16 to 50 nl/mm$^2$. When the ink receiving layer is present, the leather coloring can be made higher in grade and more stable. More improvements can be achieved especially when high-density printing is carried out at a lower printing speed than the printing speed corresponding to the frequency in the printing carried out as leather coloring, e.g., double-density printing is carried out at a coloring speed of ½, when the printing is superimposingly carried out on the same recording area by repeating record scanning several times, or when the drive of an ink-jet head is controlled so as to increase the quantity of ink ejection.

In addition to the foregoing, the process of the present invention may further comprise the step of fatliquoring (to impart softness to leather by making the leather absorb an oil) carried out by ink-jet means. In such a process of the present invention, further comprising the step of fatliquoring, the colored portions can be made to have a higher density and a higher strength, and hence a toughness comparable to that achievable in conventional dyeing can also be achieved. Meanwhile, this fatliquoring is often carried out using a vegetable oil, and a treating solution for this fatliquoring may be imparted by the ink-jet means, so that the time for this treatment can also be significantly shortened.

Inks used in ink-jet coloring systems are hitherto imparted to paper, and commonly contain water in a large quantity. In the present invention, inks are not limited to such inks, and may appropriately be inks having suitable components, including inks containing a non-volatile solvent, according to the type of leather and the properties thereof varied depending on treatment carried out before coloring. As the ink-jet system, any of a charge control type, a jet system coloring using a piezoelectric device, and a jet system using an exothermic device may be employed. Among these, the jet system using an exothermic device is preferable since the coloring head can be assembled in a high density.

In a preferred embodiment of the present invention, the process or apparatus may further comprise the constitution, step or means of accelerating the fixing of ink in leather. Stated specifically, the leather surface may be made to have a lower wettability, the leather coloring areas may be degreased to a higher level, or an ink receiving layer may be added. Any one of these or a combination of some of these enables improvement in leather coloring efficiency. As materials for the ink receiving layer, water-soluble resins such as polyvinyl alcohol, polyvinyl pyrrolidone and cellulose are preferable in the case when ink solvents used are of aqueous types. Such an ink receiving layer may be formed of a single material or a mixture of two or more materials, or may be provided in a single layer or in two or more layers. The ink receiving layer can be provided by various methods such as a method in which an aqueous solution thereof is coated by means of a bar coater, a roll coater, a doctor blade or the like, a method of screen coloring, and a method in which any of the above materials formed into a film is contact bonded.

To make the leather surface have a lower wettability, it is preferable to provide a heating means. In the case of the present invention, low-temperature heating is preferred in order to prohibit the decomposition of constituents such as protein of the leather. In particular, the decomposition of collagen attributable to the representation of a sense of high grade of leather tends to cause shrinkage, a change in properties and a lowering of texture, making it necessary to further treat products in subsequent steps to improve properties of leather. Hence, in the above invention where the heating is carried out, the leather is heated so as for the leather itself to be kept at a temperature of 60° C. or below, and preferably about 50° C., at maximum before and after the ink-jet leather coloring or in the course of the leather coloring. As the heating means used in the present invention, it is possible to use a method in which the leather is heated with a heating plate from the side opposite to the side on which the leather coloring is carried out (the leather coloring side), a method in which the leather is heated with a heating roller from the leather coloring side, or a heating method provided with an air blowing means having a temperature control function that can maintain the above preset temperature.

In the present invention, a protective layer may be formed on the colored surface of the leather having been subjected to the ink-jet leather coloring of the present invention. As a material therefor, polyamide is commonly used as a top coat. This is also preferable in the present invention. It is preferable to provide a protective layer capable of prohibiting a coloring material of ink from migrating, and preferably capable of exhibiting light fastness and corrosion resistance.

As coloring materials for coloring, dyes and pigments conventionally available may be used. Among them, pigments have been more commonly and also effectively used in a finishing step in the conventional dyeing of leathers. In the case of the leather coloring carried out by the ink-jet coloring system, the coloring materials need not be limited to either dyes or pigments. Since, however, pigments are usually insoluble in solvents and have no coloring properties to leather itself, they may preferably be brought into dispersions in the form of emulsions with synthetic resins, when used. On the other hand, in the case of dyes, most of them are readily soluble in water or alcohol, and can be used with ease. Dyes that can be used may include various types, and can be used with relative ease so long as they are dyes widely used for protein fibers. For example, acid dyes, metal complex salt dyes, basic dyes, mordant dyes, acidic mordant dyes and soluble vat dyes are widely used also in the conventional coloring of leathers. Besides these, it is also possible to use direct dyes, cationic dyes, sulfur dyes, naphthol dyes, oxidation dyes, disperse dyes and reactive dyes mainly used for fibers of cellulose or polyester types. When, however, these are used in the coloring of leathers, importance is attached to properties such as water resistance, perspiration resistance, solvent resistance and fastness to sunlight. Hence, of these dyes, metal complex salt dyes are particularly preferred. For other dyes, in order to satisfy these properties, a dye fixing treatment may be applied after coloring or a treatment to decrease activity of dyes may be added. Also, in order to bring out these properties, dyes and pigments may be used in combination.

EXAMPLE 1

Figure 2:
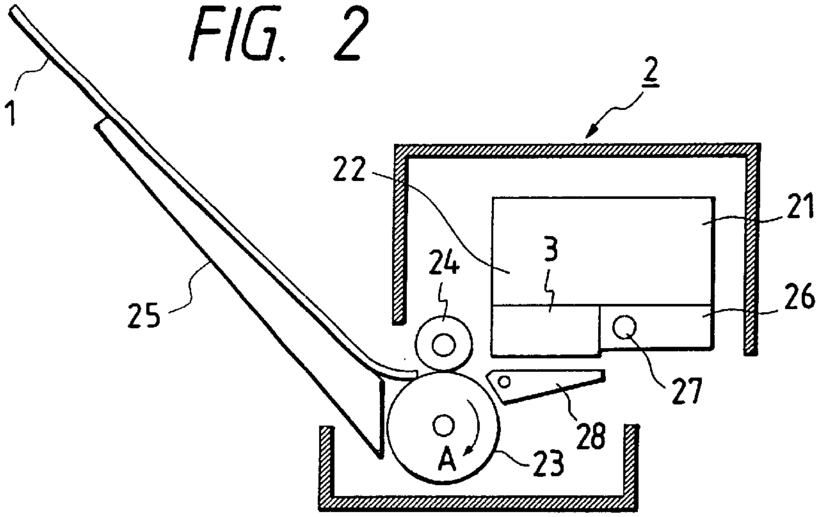
FIG. 2 illustrates the main constitution of an ink-jet leather coloring apparatus used in Example 1 of the present invention.

FIG. 1 illustrates an example of the procedure for leather treatment employed in the first embodiment of the present invention, which is comprised of a procedure wherein raw hide or skin is subjected to a beamhouse process, a tanning process, a coloring process and a finishing process until a leather product is obtained. FIG. 2 illustrates the main constitution of a leather coloring means in an apparatus used in the ink-jet leather coloring. The leather coloring of the present Example will be described with reference to FIGS. 1 and 2, which is carried out according to the following procedure.

In the production of leather used as a coloring medium, it is prepared through a tanning process conventionally carried out. The steps up to this stage can be roughly described as follows: First, a starting raw hide or skin of animals such as bovines, horses and pigs is treated to remove dirts, subcutaneous connective tissue, and hair, and then subjected to splitting to split the hide or skin in the desired thickness, followed by removal (scudding) of grease and pigment matter and thereafter washing with water to clean the pelt. Such a beamhouse process thus carried out is subsequently followed by a tanning process, where the hide or skin is tanned after removal of lime (deliming) and washing with water and also after soaking in a mild acidic aqueous medium. Methods for tanning are roughly grouped into chrome tanning and vegetable tanning, which provide different affinities for dyes according to their ionic properties. In general, in the case when chrome tanning has been carried out, the treated product has an affinity for anionic dyes, and in the case when vegetable tanning has been carried out, an affinity for cationic dyes. These types of tanning may be appropriately selected according to the state of a finished leather and the kinds of dyes used in coloring.

In the present Example, horse hide was used as a raw hide. The hide was subjected to the above beamhouse process, and thereafter treated by chrome tanning, followed by coloring pretreatment comprised of dewatering, shaving and depickling neutralization to obtain a hide for coloring. In order to ensure affinity of a coloring material in the subsequent ink-jet coloring, the hide was further subjected to filling treatment using a urea solution of casein. A filler used in this step was a solution commonly used in leather dyeing. It is also possible to use a solution of acrylate or urethane. The hide thus treated was divided by cutting in size to have dimensions corresponding to long sides of A3-size, and thereafter made into a leather 1 so formed as to be passable through a coloring medium transport path of an ink-jet leather coloring apparatus 3.

Leather coloring subsequently carried out on the leather thus obtained will be described here. The leather 1 having cut as described above is set on the upstream side of the transport direction of paired transport rollers (a transport drive roller 23 and a transport following roller 24) serving as a means for transporting the leather coloring medium in the ink-jet leather coloring apparatus 2. After the ink-jet leather coloring has been made ready and the coloring step is started, first the transport drive roller 23 and the transport following roller 24 that follows the former begin to rotate, and the leather 1 set end-to-end with the transport drive roller 23 is drawn into the pressure contact portion of the paired transport rollers rotating, so that the leather 1 is automatically fitted to the transport means. Then, in synchronization with the transport of the leather 1, an ink-jet coloring assembly 22 provided on the transport path is operated to carry out coloring on the leather 1 in accordance with image data. The colored leather 1 delivered out of the ink-jet leather coloring apparatus after the coloring has been completed is naturally dried. The leather 1 colored through such steps is thereafter subjected to fatliquoring using fat and oil such as fish oil or vegetable oil, whereupon the coloring step is completed. The step of fatliquoring carried out here may follow any methods conventionally employed. In the present Example, using a drum, the fatliquoring was carried out at 55° C. for 30 minutes, with a solution prepared by mixing olive oil. Thus, a leather endowed with softness and strength is obtained.

The colored leather produced in this way is further transferred to a finishing process comprised of setting-out, trimming and glazing, followed by processing necessary for various purposes to obtain a leather product.

The ink-jet leather coloring apparatus 2 used in the present invention will be described below. FIG. 2 illustrates the main part of an example of the constitution of the ink-jet leather coloring apparatus used in the present Example. In FIG. 2, a carriage 26 is mounted with an integral coloring head cartridge 22 integrally made up with four ink tanks 21 respectively filled with black, cyan, magenta and yellow, four color inks, and four ink-jet coloring heads 3 for respectively ejecting the four color inks. These ink tanks are filled with inks (A) to (D) shown below. In the following, "%" is "% by weight" unless particularly noted.

Preparation of ink (A):

| | |
|---|---|
| Acid dye (C.I. Acid Brown 13) | 2% |
| Acid dye (C.I. Acid Orange 67) | 1.5% |
| Acid dye (C.I. Acid Blue 92) | 0.5% |
| Thiodiglycol | 5% |
| Isopropyl alcohol | 3% |
| Potassium sulfate | 0.01% |

-continued

| | |
|---|---|
| Sodium metasilicate | 0.001% |
| Ferric sulfate | 0.0005% |
| Nickel sulfate | 0.0003% |
| Zinc sulfate | 0.0003% |
| Water | balance |

All the above components were mixed, and the mixture obtained was adjusted to pH 8.2 with sodium hydroxide, and then stirred for 2 hours, followed by filtration using Fluoropore Filter FP-100 (trade name; available from Sumitomo Electric Industries, Ltd., this is to be the same in the following) to obtain ink-jet leather coloring ink (A).

Preparation of ink (B):

| | |
|---|---|
| Acid dye (C.I. Acid Blue 185) | 9% |
| Thiodiglycol | 23% |
| Triethylene glycol monomethyl ether | 6% |
| Potassium chloride | 0.05% |
| Sodium metasilicate | 0.001% |
| Ferric chloride | 0.0005% |
| Zinc chloride | 0.0003% |
| Water | balance |

All the above components were mixed, and the mixture obtained was adjusted to pH 8.3 with sodium hydroxide, and then stirred for 2 hours, followed by filtration using Fluoropore Filter FP-100 to obtain ink-jet leather coloring ink (B).

Preparation of ink (C):

| | |
|---|---|
| Acid dye (C.I. Acid Red 266) | 7% |
| Thiodiglycol | 15% |
| Diethylene glycol | 10% |
| Tetraethylene glycol dimethyl ether | 5% |
| Potassium chloride | 0.04% |
| Sodium sulfate | 0.01% |
| Sodium metasilicate | 0.001% |
| Ferric chloride | 0.0005% |
| Nickel chloride | 0.0002% |
| Water | balance |

All the above components were mixed, and the mixture obtained was adjusted to pH 7.9 with sodium hydroxide, and then stirred for 2 hours, followed by filtration using Fluoropore Filter FP-100 to obtain ink-jet leather coloring ink (C).

Preparation of ink (D):

| | |
|---|---|
| Acid dye (C.I. Acid Yellow 110) | 7% |
| Thiodiglycol | 24% |
| Diethylene glycol | 11% |
| Potassium chloride | 0.004% |
| Sodium sulfate | 0.002% |
| Sodium metasilicate | 0.001% |
| Ferric chloride | 0.0005% |
| Water | balance |

All the above components were mixed, and the mixture obtained was adjusted to pH 8.4 with sodium hydroxide, and then stirred for 2 hours, followed by filtration using Fluoropore Filter FP-100 to obtain ink-jet leather coloring ink (D).

The ink-jet leather coloring apparatus of the present Example is operated as described below. In the present Example, as shown in FIG. 2, in order to stably feed to the ink-jet coloring zone the leather 1 having been subjected to tanning and cut to the given size, an inclined feed tray 25 is provided, so that it is just inserted between the transport drive roller 23 and the transport following roller 24. In this state, as the transport drive roller 23 is rotatingly driven in the direction of an arrow A, the leather 1 is led through the contact pressure portion of the paired transport rollers and successively forwarded to the ink-jet leather coloring zone. The carriage 26 is so designed as to stand by at the home position (not shown), when no coloring is carried out or the ink-jet coloring head is operated for its restoration.

Before the coloring is started, the carriage 26 standing at the position (home position) shown in the drawing is moved along a carriage guide shaft 27 by command of coloring start, during which the four color inks are ejected from multiple nozzles of the ink-jet coloring head in accordance with coloring signals while timing on the basis of reading signals of a linear encoder. Thus, a print is made in a coloring width d on the coloring surface. With this coloring scan, inks impact on the coloring surface in the order of black ink, cyan ink, magenta ink and yellow ink to form dots. Once ink discharge due to the image data have completed up to the end of the coloring surface, the carriage 26 is returned to the home position, and the ink ejection is again carried out on a next line. After this first coloring is completed and before the second-time coloring is started, the transport drive roller 23 is rotated to transport the leather 1 by the coloring width d. In this way, the coloring by the ink-jet coloring head in the coloring width d for each scan of the carriage and the transport of leather are repeated until the image formation on the coloring surface is completed. At the time the coloring has been completed, the colored leather is delivered out by the transport means and at the same time a platen 28 having formed a plane coloring surface during the coloring is inclined in the direction of delivery so that it helps the delivery at the rear end of the apparatus. In order to help the delivery, a means such as spur rollers may be provided at the downstream side of the coloring zone.

In the case of leathers, their thickness may be in variety depending on the kinds of raw hide and the manners taken in the beamhouse process and tanning process. Hence, it is more effective to provide a mechanism that can variously set the distance between the ink ejection face of the integral head cartridge 22 and the platen 28 in accordance with the thicknesses of leathers on which the coloring is being carried out.

Figure 3:
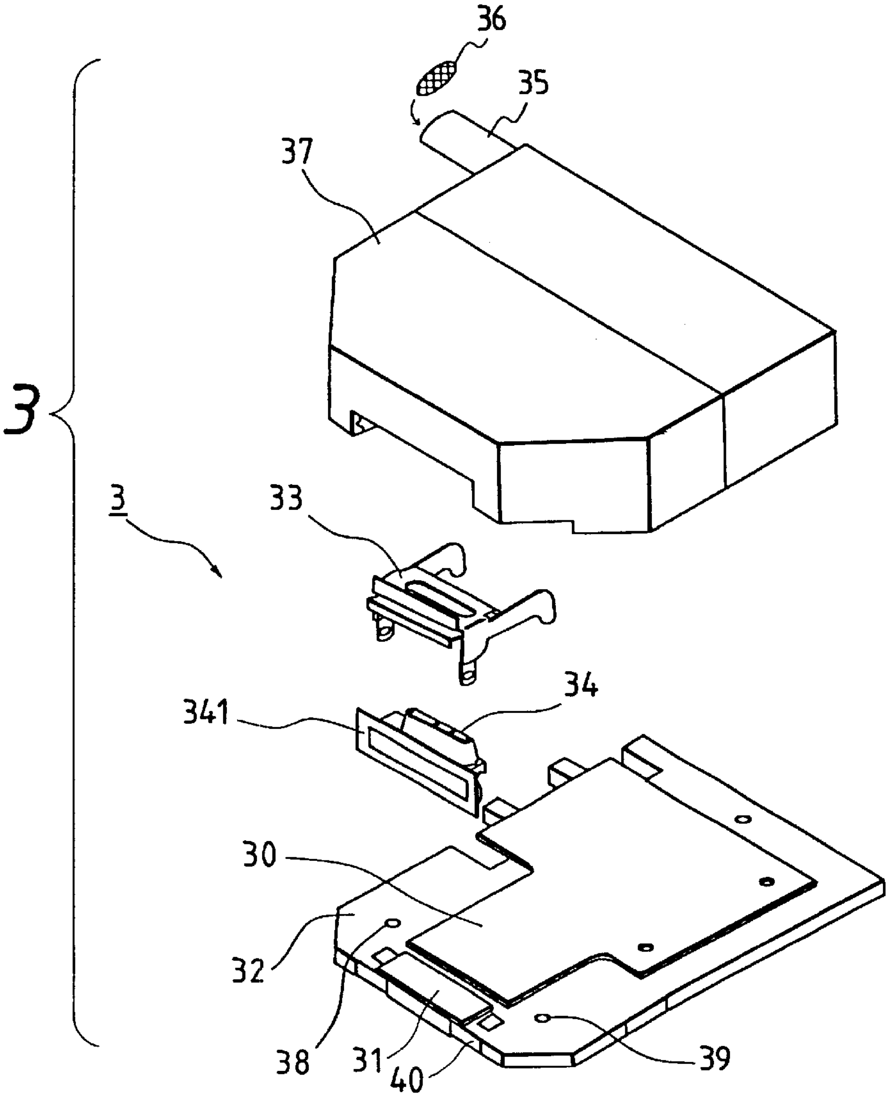
FIG. 3 illustrates the constitution of an ink-jet head that can be used in the present invention.

FIG. 3 illustrates the constitution of the ink-jet head 3 from which the inks are ejected. One end of a wiring substrate 30 is mutually connected with the wiring portion of a heater board 31. At another end of the wiring substrate 30, a plurality of pads are provided, corresponding with electric energy-heat energy converters for receiving electric signals sent from the main-body apparatus. Thus, the electric signals sent from the main-body apparatus can be supplied to the respective electric energy-heat energy converters. A support 32 made of metal, for supporting the back of the wiring substrate 30 on plane serves as a bottom plate of the ink-jet coloring unit. A press spring 33 i) has a member formed to have a bend substantially U-shaped in its cross section in order to linearly elastically press the area in the vicinity of an ink ejection outlet of a grooved top plate 34 provided with grooves to become an inner wall of nozzle, ii) claws hooked utilizing relief holes provided in the support 32 made of metal, and iii) a pair of rear legs for receiving on the metal support 32 the force acting on the spring. On account of the force of this spring, the wiring substrate 30 is fitted in pressure contact with the grooved top plate 34. To the support, the wiring substrate 30 is fitted by sticking them with an adhesive or the like.

At the end of an ink feed pipe 35, a filter 36 is provided. An ink feed member 37 is made by molding, and the grooved top plate 34 is integrally provided with flow paths leading to an orifice plate 341 and ink feed openings. The ink feed member 37 can be simply fixed to the support 32 by making two pins (not shown) project through two holes 38 and 39, respectively, of the support 32 and thermally fusing them. When they are fixed, the gap between the orifice plate 341 and the ink feed member 37 is sealed and also the gap between the orifice plate 341 and the front end of the support 32 is perfectly sealed through grooves 321 provided in the support 32.

Figure 4:
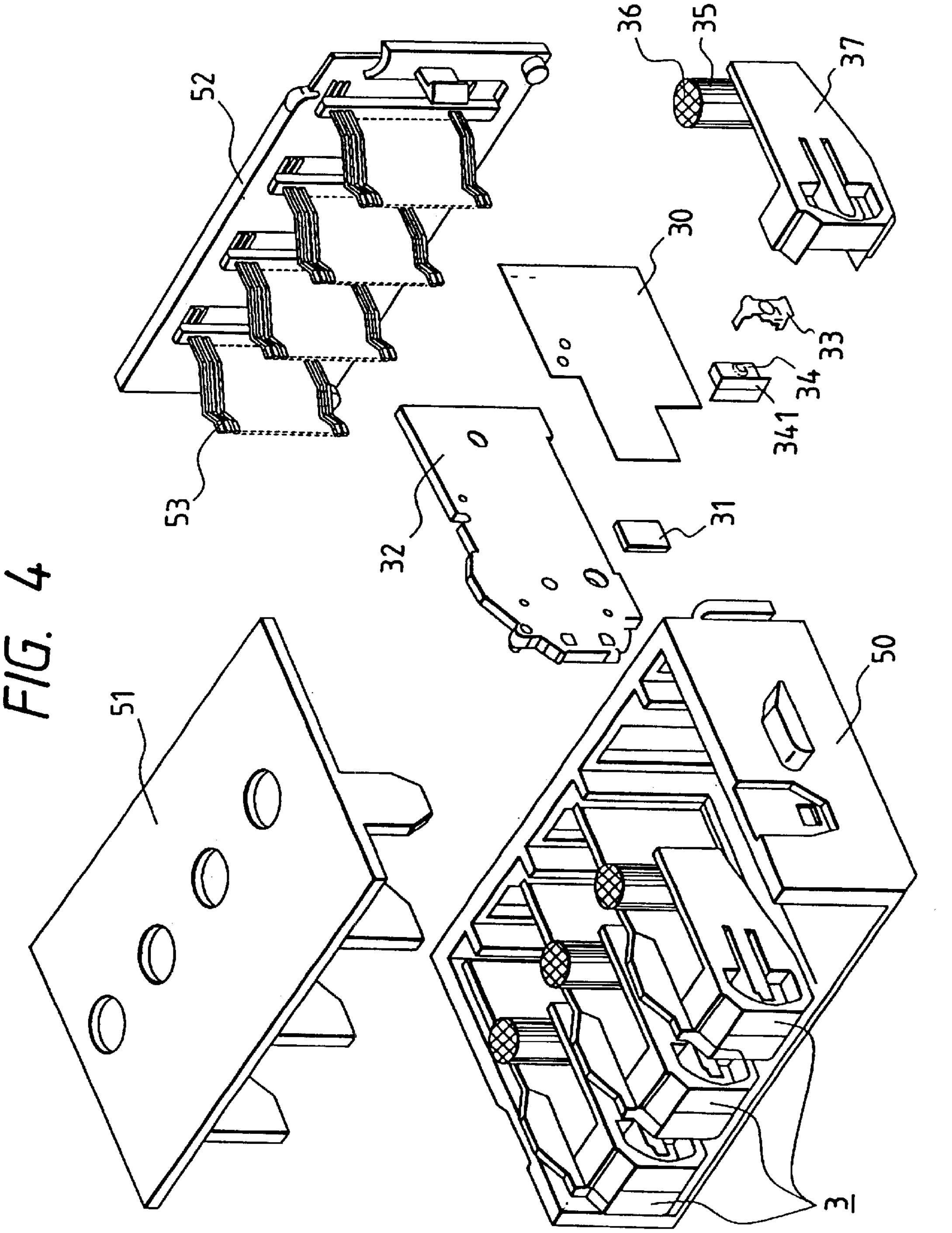
FIG. 4 illustrates the constitution of a color ink-jet head that can be used in the present invention.

FIG. 4 shows the structure of a four-head integral ink-jet cartridge 22 in the state that its ink tanks have been removed, where the above four heads 3 that can respectively eject the black, cyan, magenta and yellow four inks are integrally assembled with a frame 50. The four heads are fitted in the frame 50 at given intervals, and also fixed in the state their positions in the nozzle array direction have been adjusted. In the present Example, their positions are adjusted using a mechanical standard plane of the head so that mutual ink-droplet impact positions for the respective colors can be in an improved precision. To more improve the precision, the mutual ink-droplet impact positions for the respective colors may be directly adjusted on the basis of data obtained by measuring the ink-droplet impact positions while actually ejecting inks in the state the heads are provisionally fitted to the frame. Reference numeral 51 denotes a cover of the frame; and 53, connecters for connecting the pads provided on the wiring substrate 30 with the electric signals sent form the main-body coloring apparatus. The integral assemblage of the four heads is not only advantageous in handling but also effective for improving the mutual ink-droplet impact positions of the heads as stated above, and is also greatly effective for decreasing the number of signal line connection with the main-body coloring apparatus. For example, signal lines such as GND lines common to the four heads can be made common on a connector substrate 52 to directly decrease the number of lines. Also, coloring signal lines can also be made common if an integrated circuit substrate is provided so that the heads are time-divisionally driven for each head. Such a decrease in the number of the electrical connection is effective in apparatus having many signal lines as in coloring machines or multi-nozzle high-speed coloring machines.

As described above, the conventional step of dyeing is carried out using the ink-jet leather coloring apparatus, so that the dyeing that most takes time among the dyeing and fatliquoring process including dewatering, shaving and depickling neutralization in a conventional manner, which has hitherto taken almost a day, can be completed in only several ten minutes, and also multi-color finishing has become possible without using plates.

EXAMPLE 2

Figure 5:
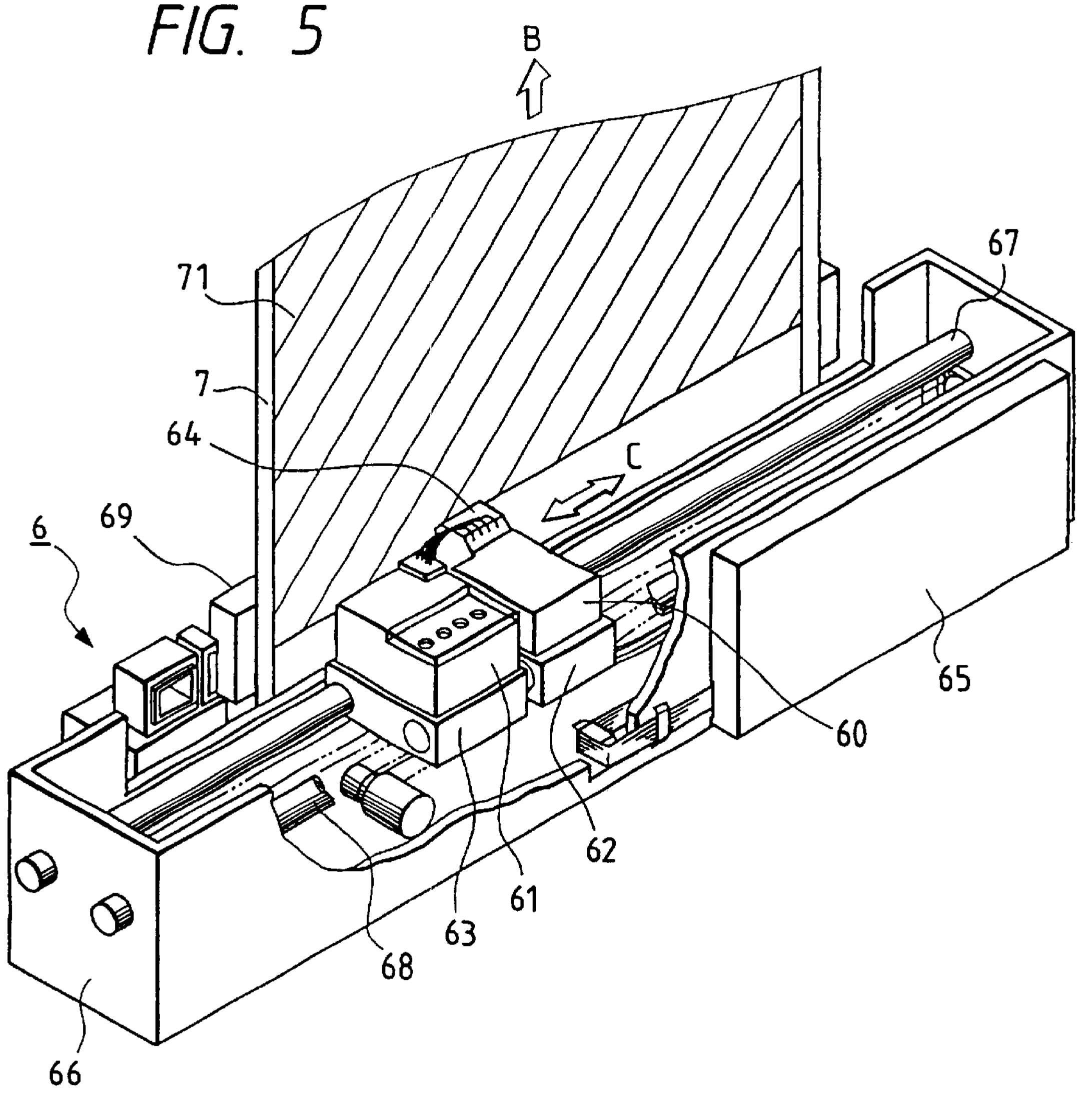
FIG. 5 illustrates the main constitution of an ink-jet leather coloring apparatus used in Example 2 of the present invention.

FIG. 5 illustrates another form of the ink-jet leather coloring apparatus, and shows an example of an apparatus that makes it unnecessary to cut the leather in a standard size. Leathers have different size depending on the kinds of starting raw hide or skin, and many of them have a larger area than the A3-size. Now, in the present Example, an ink-jet leather coloring apparatus 6 that can carry out leather coloring without regard to the size of the leather serving as a leather coloring medium is provided.

In the apparatus shown in FIG. 5, the basic operation for dyeing is the same as that in the leather coloring apparatus described in Example 1, except that a large-sized ink-jet head 60 having a number of orifices and a large-sized ink feeding assembly 61 so designed that inks can be fed in large quantities are provided on a carriage 62 and a carriage 63, respectively, in the ink-jet leather coloring zone in order to make the apparatus adaptable to large-sized coloring mediums (leathers). These are connected through a tube 64 so that the inks are fed from the ink feeding assembly 61 to the ink-jet head 60. According to signals sent from a transmitter to the ink-jet head 60, the two carriages are reciprocatingly moved to scan in the directions of arrows C shown in the drawing, along a guide rail 67 and a guide rail 68, respectively, fitted to a frame 66, and at the same time the jetting of inks from the ink-jet head 60 in accordance with image signals is started, and thus coloring can be made on a leather 7.

Leather coloring carried out using this ink-jet leather coloring apparatus is operated as described below. First, using bovine hide as a raw hide, the hide is treated up to the stage prior to the dyeing in the same manner as in Example 1 to prepare a leather for leather coloring. One end of the back of the leather is set fittingly to a platen 69 (its fitting portion is now shown). Thereafter, ink-jet timing signals for each orifice of the ink-jet head are produced from image signals supplied to the transmitter 65 from an image signal generator separately provided, and inks for coloring are jetted to the leather 7. Then, every time the ink-jet head has scanned once, the leather is moved in the direction of an arrow B by the width a coloring has been thus made. With subsequent repetition of this operation, colored areas 71 successively appear on the leather 7, and finally extend over the whole surface of the leather 7, where the coloring is completed.

Leathers coming out of the tanning process are commonly not uniform in shape, and also their edges are not formed in straight lines. Thus, if the leather is passed as it is, through the ink-jet leather coloring apparatus shown in FIG. 5, the ink to form images may be jetted outside the leather face. As a result, it follows that the inks are jetted onto the platen 69 to contaminate the surface of the platen. If such a phenomenon occurs, the back of the coloring surface may be stained when a next leather is passed to make subsequent coloring, or the inks jetted on the platen become dry and may form deposits thereon to hinder a smooth movement of leather on the platen, causing a faulty transport of the leather. In order to prevent such difficulties, a sheet of paper coated with an adhesive readily separable after the coloring has been completed may be stuck to the non-coloring surface of a leather before the leather is set on the ink-jet leather coloring apparatus. It is also effective to add processing such that the ends of a leather on the platen are detected at every scan of the carriage during the operation of coloring so that the image data are deleted from its portions extending out of the edges.

The leather 7 having gone through the coloring is subjected to fatliquoring in the same manner as in Example 1, and then transferred to the finishing process so as to be processed into a leather product.

According to the example described above, it is unnecessary to cut leather in standard size after tanning, so that the coloring step can be made more efficient and rapid. It is also possible to treat leathers in free form.

EXAMPLE 3

Figure 6:
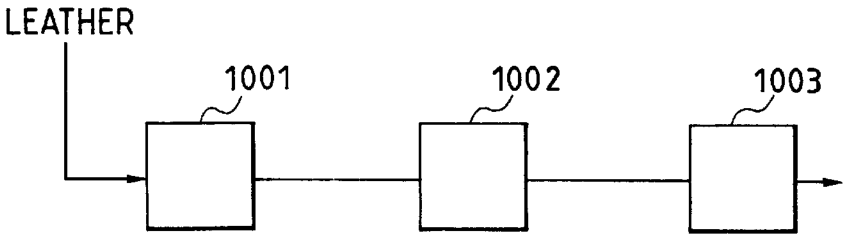
FIG. 6 conceptually illustrates ink-jet leather coloring in Example 3 of the present invention.

FIG. 6 schematically illustrates a process where the fatliquoring after the leather coloring is also carried out by applying the present invention, using an ink-jet coloring apparatus. Here, the steps up to the step prior to the coloring, i.e., the beamhouse process, the tanning process, and dewatering, shaving, up to depickling neutralization, are the same as those in Example 1, and the description thereon is omitted. The leather for coloring, having been subjected to up to the depickling neutralization, is cut in A3-size, and is lead to a leather coloring zone 1001 where the coloring is carried out by ink-jet coloring. The leather coloring at this leather coloring zone 1001 may be carried out using the same apparatus as used in Example 1. The leather subjected to the coloring using the ink-jet leather coloring apparatus and delivered out of it, is subsequently sent into a dryer 1002, and dried there at 50° C. for 1 minute to carry out fixing of the image formed by coloring.

Thereafter, the leather is transferred to a fatliquoring device 1003, and subjected to fatliquoring. When ink-jet is utilized here, fats and oils must be caused to fly and the dot density need not be set finer than the case when images are formed. On account of these points, an ink-jet system employing an electric energy-heat energy converter, i.e., an ink-jet system where ink droplets are caused to fly by means of a piezoelectric device is preferred to the ink-jet coloring system employing an electric energy-heat energy converter, described in the previous coloring. In this fatliquoring device, drum treatment is carried out after application of fats and oils. According to the present example, treating solutions used in this fatliquoring may preferably be those having a relatively low viscosity, taking account of the performance when jetted. In this example, castor oil having a viscosity of 100 cP at 25° C. was used. The leather having been subjected to this fatliquoring is subsequently sent to the finishing process, and thus a leather product is obtained.

As described above, since the processes of dyeing and fatliquoring are carried out using an ink-jet leather coloring apparatus, the time taken for the coloring and fatliquoring can be shortened as a matter of course, and the steps concerning the dyeing can be automated with ease as a continuous flow, to bring about a process cost reduction.

EXAMPLE 4

Figures 7, 7A:
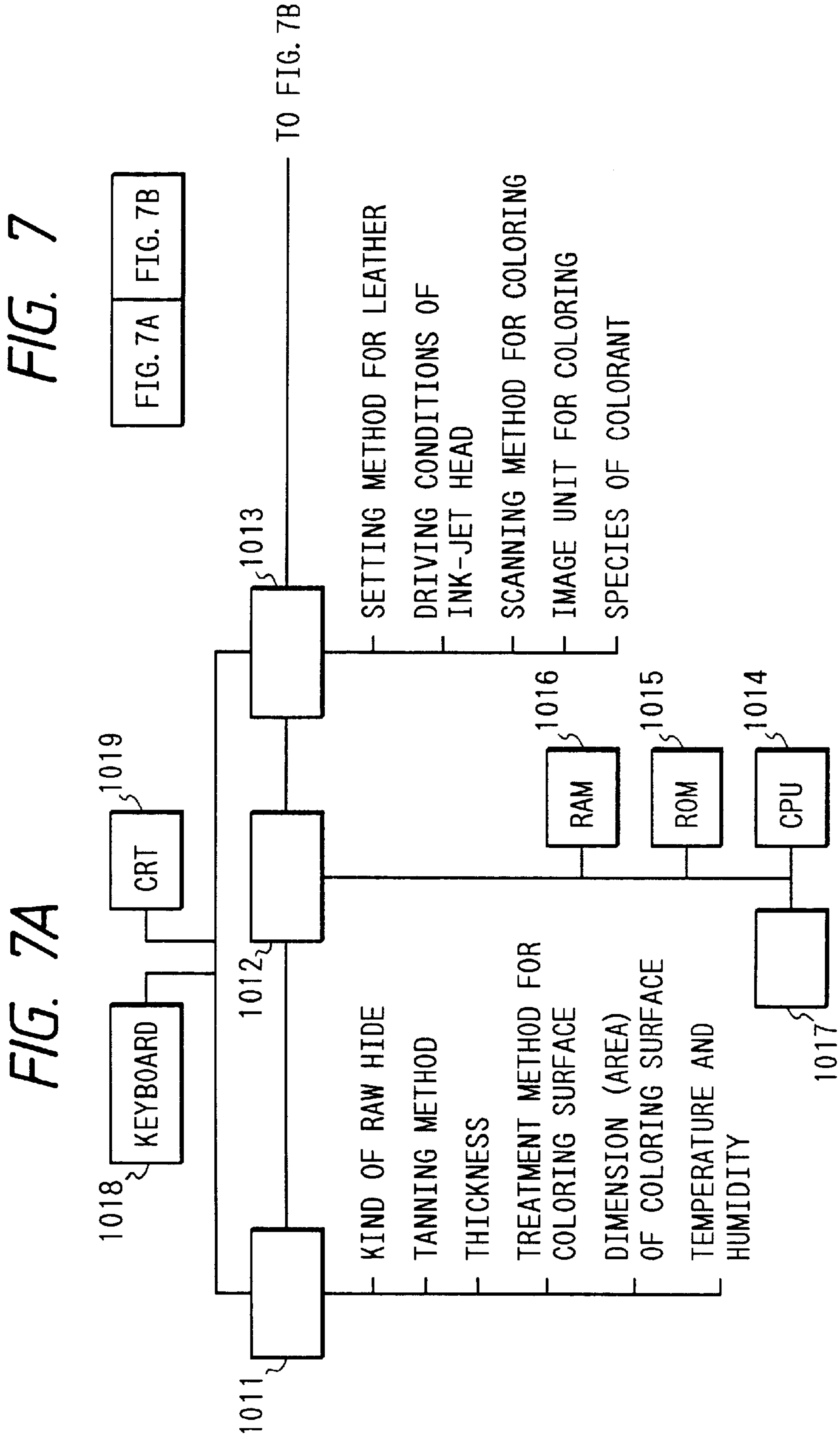
FIG. 7 is comprised of FIGS. 7A and 7B conceptually illustrating a system of ink-jet leather coloring in Example 4 of the present invention.
Figure 7B:
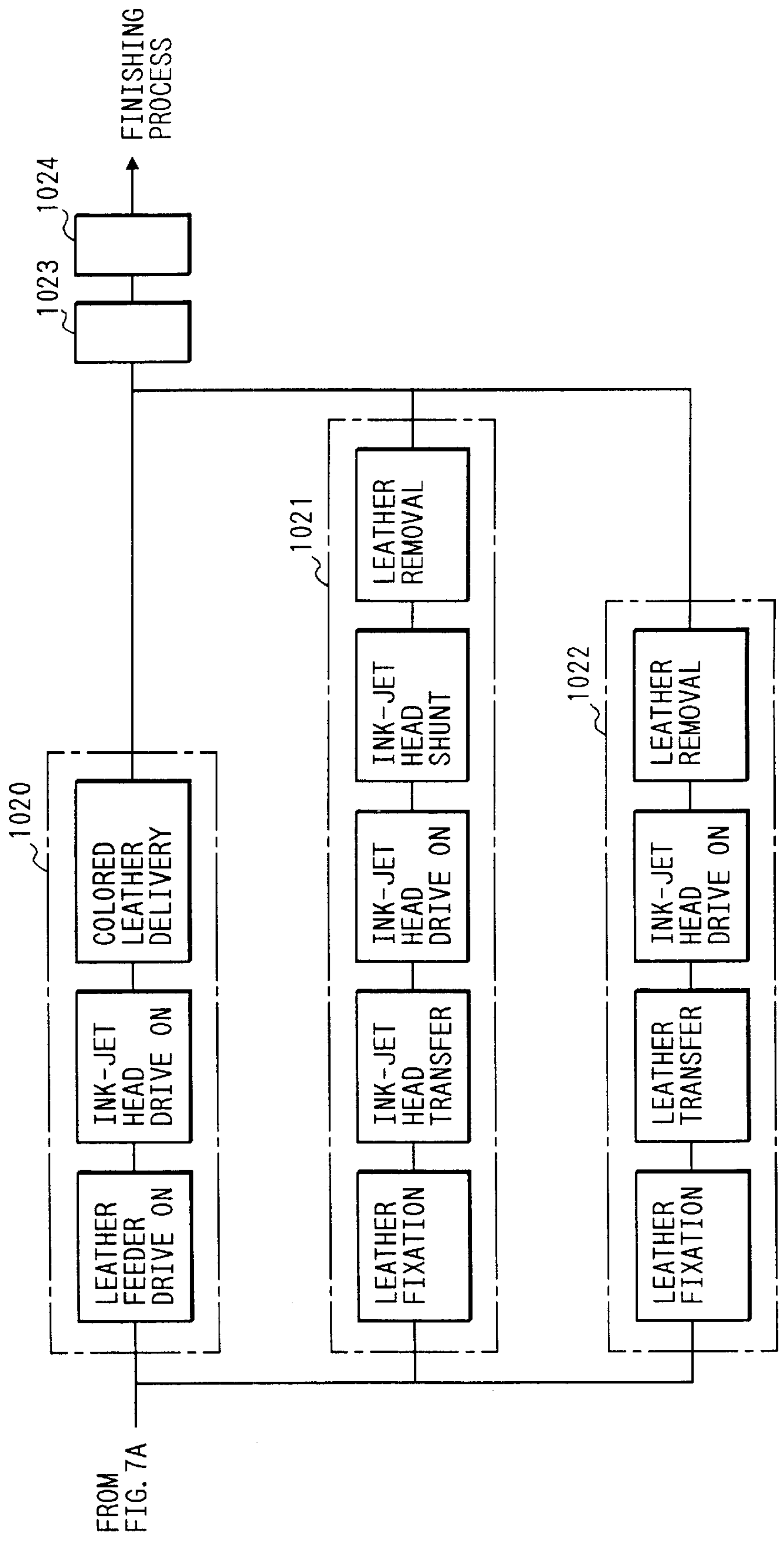

FIGS. 7A and 7B show an example of a system in which the present invention is applied so that various kinds of leathers can be processed in the same apparatus in the step of leather coloring. In this example, three kinds of ink-jet leather coloring apparatus are set up in combination so that the coloring on many kinds of leathers can be carried out in one system. First, in respect of leathers intended for leather coloring, the data necessary for the leather coloring, i.e., the kind of raw hide or skin, the method of tanning employed in the tanning step, the thickness of leather, the method of treating the coloring surface (filling treatment), carrier out before the leather coloring, the size or area of the coloring surface, the temperature and humidity at the time of the leather coloring and so forth, are preset by means of a leather properties data preset unit 1011 while a user operates the apparatus through a keyboad or switches on a panel. Based on the data thus preset, a procedure most suited for the leather coloring is automatically determined in an arithmetic unit 1012. To this arithmetic unit 1012, a CPU 1014 is connected so that its processing can be controlled. The data already preset in the leather properties data preset unit 1011 are stored in a RAM 1016. This data, the content of a ROM 1015 in which data of suitable processing methods having been programmed according to conditions of various leathers, and the data of a coloring image storage unit 1017 are used to carry out an arithmetic operation, and the results obtained are outputted to a coloring method decision unit 1013. In the coloring method decision unit 1013, the drive conditions including the manner of leather fitting at the time of leather coloring, the kinds of ink-jet heads used for the leather coloring and the scanning times of the ink-jet heads, the manner of scanning for coloring (in the case of multi-color coloring, the order of colors, the distances at which the respective color inks are ejected, etc.), the basic constituent units of coloring images, the kinds of coloring materials used in the leather coloring (the type of dyes or pigments and the type of coloring solutions containing them), and so forth are decided and outputted therefrom. The decision of these is transmitted to power sources necessary for operating the ink-jet leather coloring apparatus, and at the same time the contents thereof are displayed on a CRT 1019 so that the user can make confirmation. Here, for the case when the coloring method must be changed by the user, a feed back circuit is added so that data can be further inputted through a key-board 1018 to change the preset data. In accordance with the leather coloring process decided as described above, signals are sent out to any of the ink-jet leather coloring apparatus 1020 to 1022. The leather is suitably set on the ink-jet leather coloring apparatus thus decided, so that the leather coloring is carried out on the leather in the best manner.

These ink-jet leather coloring apparatus are constituted as respectively described below. The ink-jet leather coloring apparatus 1020 is operated in the manner as described in Examples 1 and 2, and its details are omitted. The ink-jet leather coloring apparatus 1021 is an apparatus in which the leather is set stationary and ink-jet heads are moved and scanned over its coloring surface to carry out coloring, and is an apparatus adapted to leathers whose coloring surfaces have complicated shapes or no flatness. The ink-jet leather coloring apparatus 1022 is an apparatus matched to the coloring on large-sized leathers, where a leather is stereo-scopically set stationary outside the apparatus and, after being brought into a form feasible for coloring, the apparatus is driven. This can be used also when the leather could not be well treated before the leather coloring. These apparatus can be applied similarly in either monochromatic coloring or multi-color coloring. Also, a series of ink-jet leather coloring steps may be carried out plural times on the same leather.

The leather on which the ink-jet leather coloring has been completed using any of the ink-jet leather coloring apparatus 1020 to 1022 is passed through a drying section 1023 and a fatliquoring section 1024 and thereafter transferred to the finishing process, where it is processed into a final product.

In the examples described above, the coloring process can be automatically selected, and hence the leather coloring can be arbitrarily carried out on many kinds of leathers. Thus, the manufacture in small lots according to demands can be achieved at a low cost.

In the examples described above, an image fixing treatment may be further applied after the ink-jet leather coloring, where dye fixing agents and so forth used in textile printing may be used in a step after the completion of leather coloring and before the fatliquoring. In order to rapidly carry out drying after the leather coloring, the ink-jet leather coloring apparatus may be optionally further provided with a heating means or a hot air blowing means at its colored leather delivery outlet. Also, in order to accelerate the adhesion of coloring materials before the leather coloring, cationizing treatment or alkali treatment commonly carried out may be applied according to the properties of coloring materials, and also leathers may be moistened right before the leather coloring. These are effective means.

It is also effective to design the apparatus so that the shot-in ink quantity can be adjusted and selected according to the types of leathers in the ink-jet leather coloring zone. Stated additionally, the step of ink-jet leather coloring has been described above giving examples where the heads are scanned for coloring once. The present invention is by no means limited to such examples, and embraces examples where the same step is repeated plural times to superimpose colors on the same portion of the leather.

As described above, although coloring to leathers has hitherto taken much labor and time and also have had a difficulty in multi-color coloring, it has become possible according to Examples 1 to 4 to achieve a leather coloring process that can of course carry out multi-coloring, can make treatment time short and also can be automated with ease. This makes it possible to carry out mass-treatment and also to manufacture many kinds of products in small quantities and to meet detailed demands in the market.

Second Embodiment

Subsequently, the constitution of the present invention for the first object of the specified technical subject mentioned above will be described.

As a main feature of the second embodiment of the present invention, the invention is a leather coloring process having the step of printing an image on a natural leather having been subjected to tanning, the leather coloring process comprising;

- a jet coloring step of jetting to the leather a liquid ink containing a coloring material, in the form of droplets corresponding with given information to carry out coloring; and
- a permeation step of imparting to the leather a coloring material fixing agent capable of reacting with the coloring material of the liquid ink jetted in the form of droplets and permeable in the leather, to cause the latter to permeate into the former.

It is preferred in the second embodiment of the present invention that the coloring material in the liquid ink comprises an anionic coloring material and the coloring material fixing agent in the permeation step comprises a liquid containing a cationic substance; or that the coloring material in the liquid ink comprises an anionic coloring material, the coloring material fixing agent in the permeation step is a liquid containing a cationic substance, the liquid further containing a cationic high-molecular weight substance.

It is also preferred in the other embodiment of the present invention that the leather having been subjected to tanning is provided on the coloring surface of the leather, with an ink receiving layer for making the permeation of the liquid ink in a desired form, before the step of leather coloring; or that the permeation step is a step carried out at the same time with the jet coloring step, or a step following the jet coloring step.

According to the second embodiment of the present invention, the process has the jet coloring step carried out on the leather by jetting to the leather the liquid ink in the form of droplets corresponding with given information to form an image, and the permeation step of imparting to the leather a coloring material fixing agent capable of reacting with the coloring material jetted in the form of droplets and permeable in the leather, to cause the latter to permeate into the former. This brings about the advantages as shown below.

In the course where the liquid ink is brought into contact with the leather to come to adhere to or permeate in it, or at the time the former has completely adhered or permeated to have dyed the latter or thereafter, the coloring material contained in this liquid ink and the coloring material fixing agent having permeated in the leather and present therein come into contact with each other and instantaneously the coloring material is made insoluble, i.e., the coloring material is fixed. Hence, thereafter, no image disturbance due to a decrease in density or a change in bleeding may occur even if water or the like adheres to the leather to again dissolve the coloring material or make it migratory. Because of such a mechanism, the coloring material fixing agent can be effective in any of the case when permeated by previously imparting it into the leather to be subjected to jet coloring, the case when permeated by imparting it at the same time the ink is jetted to the leather during the operation of jet coloring, and the case when permeated by imparting it after the jet coloring has been completed. For this reason, as the order for the steps, either the liquid ink jet coloring step or the coloring material fixing agent permeation step may be carried out first, or both may be carried out simultaneously. There is also no limitation on the difference in time between the two steps. The same effect can be achieved in all instances.

As stated previously, the permeation step, i.e., jetting the liquid ink in the form of droplets may preferably be carried out by the ink-jet coloring system. Coloring materials usually used in the ink-jet coloring system include various types of dyes and pigments. Most of them show anionic properties, even with differences in degree. Hence, when those having a polarity reverse to that of the coloring material, i.e., cationic ones are used as the coloring material fixing agent used in the permeation step of the present invention, the coloring material and the coloring material fixing agent come in contact with each other through electrical attraction and the reaction caused by ionic bonding takes place between the both, so that the coloring material can be more strongly fixed and be made insoluble. Such anionic coloring materials include acid dyes, direct dyes, metal complex salt dyes and reactive dyes, as well as some pigments. In the case of dyes, most of them are readily soluble in water or alcohols, and can be used with ease. On the other hand, in the case of pigments, they are usually insoluble in solvents and have no dyeing properties to leather itself, and hence they may preferably be brought into dispersions in the form of emulsions with synthetic resins, when used. These dyes and pigments may also be used in combination.

As for leathers, since they had been originally skins that had protected the internal organs and muscles of animals and had breathed by themselves, they had a very large water content. Thus, they can be said to have very high water absorption properties.

Leathers on which the coloring is carried out by the ink-jet system may preferably be those having been subjected to sammying and drying after tanning. Even if they have been passed through such steps, they are considered to have more or less a water content even in the state of leather, because of the properties originally possessed in the state of hides or skins. Hence, so long as the coloring material fixing agent contains a cationic substance and is formed in the state of liquid, the coloring material fixing agent can permeate into the leather whatever form is selected from the above to impart the coloring material fixing agent to the leather, and the coloring material fixing agent can be well brought into contact with the coloring material in the ink to achieve the intended effect.

In working the second embodiment of the present invention, in order to improve the quality level of the images formed by leather coloring or to accelerate fixing, it is also effective to provide an ink receiving layer capable of adjusting the permeation of the liquid ink before the step of leather coloring. Generally referring to leathers, there are various ones according to the kinds of animals and the types of tanning methods. Accordingly, when the liquid ink is jetted to form images, how the ink permeates and how the ink spreads on the coloring surface are in great variety after the ink has reached the coloring surface and before the images are fixed. Thus, for some leathers used, it is effective to make such various properties optimum to forming a desired image by the presence of the ink receiving layer. This makes it totally possible to color images on the leather itself and to make their density higher, and the ink receiving layer itself can be readily fixed to the leather. Hence, the quality of leather can be made higher as a whole. When the coloring area is partial, the ink receiving layer is more effective from the viewpoint of maintaining a high density.

In leathers, stated more specifically, in natural leathers, not a little effects of irregularities or large concavities remain because of skin surfaces, in particular, follicle mouths on the grain or various wrinkles originally present in raw hide or skin. If the coloring is carried out in that state, inks may conspicuously gather to that part because of such effects to cause uneven densities. Also when the leather is dyed after it has been smoothed to eliminate irregularities or large concavities in treating steps, it is difficult to perfectly smooth the surface. Thus, the presence of the ink receiving layer is also effective for decreasing such effects. The ink receiving layer is still also effective for the retention of images against any mechanical external force applied in the finishing process carried out after the coloring has been completed. The ink receiving layer in this embodiment is the same as in the first embodiment.

As a specific, preferred process of the second embodiment of the present invention, the invention is a leather coloring process having the step of printing an image on a natural leather having been subjected to tanning, the process comprising;

- a jet coloring step of jetting to the leather a liquid ink containing an anionic coloring material, in the form of droplets corresponding with given information to carry out coloring; and
- a permeation step of imparting to the leather a coloring material fixing agent mainly composed of a mixture of a cationic high-molecular weight substance having a molecular weight of not less than 2,000 to not more than 200,000 and a cationic substance having a molecular weight of not more than 1,000, capable of reacting with the coloring material jetted in the form of droplets and permeable in the leather, to cause the latter fixing agent to permeate into the former leather.

In the present invention, as previously described, the reaction is caused by ionic bonding to take place between the anionic coloring material and the coloring material fixing agent. It has been discovered that, in order to cause this reaction to efficiently take place, the coloring material fixing agent may preferably be mainly composed of a mixture of a high-molecular weight substance having a molecular weight of not less than 2,000 to not more than 200,000 and a cationic substance having a molecular weight of not more than 1,000, capable of reacting with the coloring material jetted in the form of droplets and permeable in the leather. In the following description, the cationic high-molecular weight substance having a molecular weight of not less than 2,000 to not more than 200,000 is called "cationic high-molecular substance", and the cationic substance having a molecular weight of not more than 1,000 as "cationic low-molecular substance", for simplification.

The mechanism of specific reaction caused by these substances will be described below.

As a first stage of the reaction, the anionic coloring material contained in a dissolved or dispersed state in the liquid ink for leather coloring and the cationic low-molecular substance contained in the coloring material fixing agent cause association by anionic mutual action between them, to instantaneously cause the coloring material to separate from the liquid phase. Subsequently, as a second stage of the reaction, an association product of the coloring material and cationic low-molecular substance is adsorbed on the other component, cationic high-molecular substance of the coloring material fixing agent, so that the size of aggregates of the coloring material, produced by the association becomes larger. At the same time, the aggregates of the coloring material, produced here, have a very large viscosity to become no longer migratory with the movement of the liquid medium is provided. Thus, the aggregates turn substantially water-insoluble to make perfect the fixing of the coloring material in the images formed.

The cationic low-molecular substance, one of these main components of the coloring material fixing agent, has the function to form the association product due to ionic mutual action between it and the coloring material, and the reaction speed for the formation of this association product must be very high. As examples of the cationic low-molecular substance that satisfies such a requirement, it may include compounds of a primary, secondary or tertiary amine type, specifically, hydrochlorides or acetates of lauryl amine, coconut amine, stearyl amine or rosin amine; compounds of a quaternary ammonium type, specifically including lauryltrimethylammonium chloride, lauryldimethylbenzylammonium chloride, benzyltributylammonium chloride and benzalkonium chloride; pyridinium salt type compounds, specifically, cetylpyridinium chloride and cetylpyridinium bromide; imidazoline type cationic compounds, specifically, 2-heptadecenyl-hydroxyethylimidazoline; and ethylene oxide addition products of higher alkylamines, specifically, dihydroxyethylstearylamine; which are preferred examples.

Further, as this cationic low-molecular substance, an amphoteric surface active agent having cationic properties in a certain pH range may also be used. As examples thereof, it may include amino acid type surface active agents; R—NH—$CH_2$—$CH_2$—COOH type compounds; and betaine type compounds, specifically, carboxylic acid type surface active agent such as stearyldimethylbetaine and lauryldihydroxyethylbetaine; as well as amphoteric surface active agents of a sulfate type, a sulfonate type or a phosphate type. When these amphoteric surface active agents are used, they must be adjusted to provide a pH not higher than the isoelectric point when mixed with a coloring solution in a leather.

Examples of the cationic low-molecular substance with a molecular weight of not more than 1,000 are shown in the above. Substances usable in the present invention are not necessarily limited to these examples. In the present invention, among the cationic substances within the range of the low molecular weight, those having a molecular weight within the range of from 100 to 700 have a good surface activity and also can fast react with the coloring material. Because of the presence of such a low-molecular weight substance (a monomer), the fixing agent can have a permeability when imparted to the leather.

As for the cationic high-molecular substance, the other of the main components of the coloring material fixing agent, this substance has, as previously stated, the function to adsorb the association product of the coloring material in the liquid ink and the cationic low-molecular substance to increase the size of aggregates of the coloring material, produced by the association, and to promote the insolubilization of the coloring material, due to solid-liquid separation, so as to accomplish the water resistance. As examples of the cationic high-molecular substance that satisfies such a requirement, it is possible to use water-soluble cationic high molecules such as polyallylamine salts, polyallylsulfone, dimethyldiallylammonium chloride, polyamine sulfonates, polyvinylamine salts and chitonic acetate. Examples are by no means limited to these. It is also possible to even substances usually nonionic, to which cationic groups have been added in part. As examples thereof, they may include copolymers of vinyl pyrrolidone and aminoalkylalkylate quaternary salts, and copolymers of acrylamide and aminomethylacrylamide quaternary salts. Of course, examples are by no means limited to these. These substances may ideally be water-soluble, and may be dispersions such as latexes and emulsions. Even those other than water-soluble ones may be used so long as they can be mediums that do not attack the leather material, without limitation to the above examples. These cationic high-molecular substance can be effective in the working of the present invention so long as they have a molecular weight of not less than 2,000, and preferably from 2,000 to 200,000. If the molecular weight is more than this range, the permeation into leather may become non-uniform, so that the substance may remain as partial filmy portions or no suitable aggregates may be formed in its reaction with the coloring material. In particular, if the substance has a molecular weight of about 1,000,000, it forms a state of coatings, so that not only the handle (or hand) of leather may be lost but also the aggregates of the coloring material may densely gather only on the surface layer portion and may come off because of mechanical external force during the finishing process, to possibly cause crocking.

In the case when the coloring material fixing agent is constituted of the cationic high-molecular substance and the cationic low-molecular substance as main components as in the preferred process as described above, a surface active agent may be optionally added besides these. For example, such a surface active agent may include higher alcohol ethylene oxide addition products, alkylphenol/ethylene oxide addition products, fatty acid/ethylene oxide addition products, polyhydric alcohol fatty acid ester/ethylene oxide addition products, higher alkylamine/ethylene oxide addition products, fatty acid amide/ethylene oxide addition products, ethylene oxide addition products of fats and oils, propylene glycol/ethylene oxide addition products, fatty acid esters of glycerol, fatty acid esters of pentaerythritol, fatty acid esters of sorbitol and sorbitan, fatty acid esters of sucrose, alkyl ethers of polyhydric alcohols, and fatty acid amides alkanolamines.

A more preferred feature of this leather coloring process is that the above coloring material fixing agent is imparted in an amount as solid content within the range of not less than 0.01 $g/m^2$ to not more than 5 $g/m^2$ per unit area of the leather, and more preferably in an amount within the range of not less than 0.05 $g/m^2$ to not more than 3 $g/m^2$ per unit area of the leather. In addition, the leather having been subjected to the tanning is a leather whitened by combination tanning, and this combination tanning may preferably be combination tanning specifically utilizing aluminum tanning, zirconium tanning, titanium tanning or silica tanning, where, in addition to such tanning, the coloring material fixing agent may preferably be imparted through an ink-jet head.

The amount in which the coloring material fixing agent constituted as described above is imparted to the leather can be defined by a commonly available method of prescribing coating weight. The unit area of the coloring surface of the leather (when the surface has fine irregularities, the unit area used in the present invention refers to the area expressed as projected area without including such irregularities) is assumed as 1 $m^2$, where, as a reasonable condition, the amount can be defined to be within the range of not less than 0.01 $g/m^2$ to not more than 5 $g/m^2$ in terms of solid content. It may more preferably be within the range of not less than 0.05 $g/m^2$ to not more than 3 $g/m^2$. If its amount is less than 0.01 $g/m^2$, the fixing agent may become not enough to cause all the coloring material to aggregate when the liquid ink reaches the leather, with some slight difference depending on the quantity of ink imparted and the state of leather. If its amount is more than 5 $g/m^2$, the permeation of ink into the leather may be partially inhibited. On the other hand, when it is within the range of not less than 0.05 $g/m^2$ to not more than 3 $g/m^2$, images themselves also can be more stably maintained to a good quality, and the coloring material can be fixed and retained at a very high level. From an other viewpoint, this coloring material fixing agent need not necessarily be imparted to the whole surface of the leather, and can be well effective when imparted to at least the portions to which the liquid ink is jetted to adhere. As already mentioned, in the case of leathers, importance is attached to the special properties called the handle, and hence it is more preferable to adjust within the minimum range the amount of the coloring material fixing agent imparted thereto. From such a viewpoint also, the handle can be brought into a preferable state when the amount is adjusted within the range of not less than 0.01 $g/m^2$ to not more than 5 $g/m^2$.

Moreover, as the state of the coloring material fixing agent imparted to the leather, the second embodiment of the present invention is characterized by causing the fixing agent to permeate. This does not mean that the permeation must be strictly uniform in the thickness direction of the leather, and it may be in a dense state relatively in the vicinity of the surface or may have more or less a gradient in the distribution of the coloring material fixing agent. Even in such a state, there is no functional difficulty.

When the coloring material fixing agent is imparted in the amount within such a range, known coating or spraying methods and devices can be utilized in the method or means and device therefor. Stated specifically, they may include coating methods making use of a bar coater or a doctor blade, coating methods making use of a spatula or a brush, spraying methods carried out using a spray gun, and a method in which the fixing agent is jetted from an ink-jet head of exclusive use in the course of the leather coloring. In particular, when the fixing agent is jetted from an ink-jet head during the operation of the ink-jet leather coloring, it is possible to control ejecting the coloring material fixing agent not to be imparted to the portions where no images are present, so that its impartment can be suppressed to a necessary minimum.

When the jet leather coloring is carried out on the leather by ink-jet system, although leathers to be colored are not limited, colors thus formed has a possibility of being affected by the base leather to cause changes, and hence the color of the base leather may preferably be close to white as far as possible. As the methods that render the base leather colors white after tanning, those carried out by aluminum tanning, silica tanning, zirconium tanning or the like, the combination tanning carried out in combination of formaldehyde tanning and aluminum tanning, chrome tanning and zirconium tanning, or the like, and the methods of making the base leather white by using white coating materials such as titanium oxide or by carrying out bleaching after vegetable tanning are hitherto known in the art. Any of these can be preferably used.

As other modes of the second embodiment of the present invention, the present invention also includes a leather and leather product on which the ink-jet leather coloring has been carried out by the leather coloring process and leather coloring apparatus having been described above, and also a leather and leather product having a protective layer so that the colored surface of the leather on which the ink-jet leather coloring has been carried out can have an improved fastness.

EXAMPLE 5

An example in which leather coloring is carried out on a leather 7 by means of the ink-jet leather coloring apparatus 6 shown in FIG. 5 will be described below with reference to FIG. 8.

Using sheep skin as a raw skin, the skin was subjected to a usual beamhouse process, followed by formaldehyde tanning. Thereafter, the skin thus tanned was subjected to sammying and shaving and then to retanning using an aluminum tanning agent, followed by fatliquoring with olive oil. The sheep leather having been subjected to such combination tanning was dried, and prepared for leather coloring. The leather produced in this way had a high flexibility and also a high whiteness, and was suitable for multi-color coloring by ink-jet coloring. Subsequently, to this leather, a coloring material fixing agent (a) shown below was sprayed over the whole grain surface thereof using a spray gun, followed by drying for 2 minutes with hot air of about 50° C. to obtain a leather 7 for leather coloring.

Coloring material fixing agent (a):

| | |
|---|---|
| Benzalkonium chloride | 2% |
| Polyallylamine hydrochloride (molecular weight: 30,000) | 5% |
| Water | 93% |

In the leather 7 thus treated, the above coloring material fixing agent (a) permeated in the inside, and was imparted in an amount of 0.1 g/m$^2$. Moreover, the handle and the whiteness was not damaged at all by this coloring material fixing agent (a) compared with the leather treatment before with it.

Figure 9:
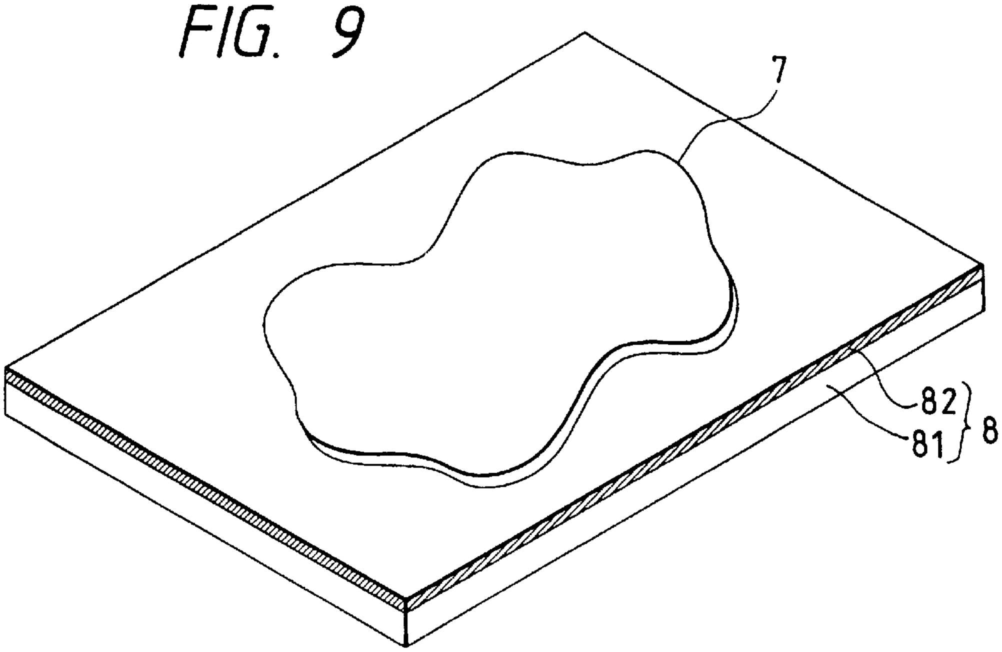
FIG. 9 illustrates a member for setting a leather in the ink-jet leather coloring apparatus used in Example 5 of the present invention.

Leather coloring subsequently carried out using the ink-jet leather coloring apparatus 6 shown in FIG. 5, on the leather 7 having been treated with this coloring material fixing agent (a), is operated as described below. Since the leather used in the present Example is sheep leather, having a very high flexibility and a stretchability, it is set on a transport support member, and thereafter mounted on the ink-jet leather coloring apparatus 6. FIG. 9 illustrates how it stands. Here, a transport support member 8 comprises a flat sheet 81 made of a vulcanized rubber having a low elongation, coated on the whole surface on one side with an adhesive 82 having a relatively weak adhesiveness. This adhesive 82 is provided only for the purpose of firmly attaching the leather 7 so as not to slip off, and hence may have an adhesiveness necessary for preventing the leather 7 from coming off by its own weight. Thus, the adhesive by no means damages the leather 7 when the leather is removed after the coloring has been completed.

Next, ink-jet leather coloring was carried out on this leather. Inks used here were inks (E) to (H) each having the composition as shown below.

Ink (E):

| | |
|---|---|
| C.I. Reactive Black 5 (a reactive dye) | 13% |
| Thiodiglycol | 15% |
| Diethylene glycol | 15% |
| Calcium chloride | 0.002 part |
| Water | Balance |

Ink (F):

| | |
|---|---|
| C.I. Reactive Blue 72 (a reactive dye) | 13% |
| Thiodiglycol | 25% |
| Triethylene glycol monoethyl ether | 4% |
| Water | Balance |

Ink (G):

| | |
|---|---|
| C.I. Reactive Red 24 (a reactive dye) | 10% |
| Thiodiglycol | 16% |
| Diethylene glycol | 10% |
| Tetraethylene glycol dimethyl ether | 4% |
| Water | Balance |

Ink (H):

| | |
|---|---|
| C.I. Reactive Yellow 95 (a reactive dye) | 10% |
| Thiodiglycol | 26% |
| Diethylene glycol | 9% |
| Water | Balance |

The respective inks were obtained by mixing all the components, stirring the mixture for 2 hours, and then filtering it using Fluoropore Filter FP-100.

To set on the ink-jet leather coloring apparatus 6 the leather 7 overlaid on the transport support member 8 as shown in FIG. 9, one end of the back (the side on which no leather 7 is overlaid) of the transport support member 8 is set fittingly to a platen 69 (its fitting portion is not shown). Thereafter, ink-jet timing signals for each orifice of the ink-jet head 60 are produced from image signals supplied to the transmitter 65 from an image signal generator separately provided, and inks for coloring are jetted to the leather 7. Then, every time the ink-jet head has scanned once, the leather is moved in the direction of an arrow B by the width a coloring has been thus made. With subsequent repetition of this operation, colored areas 71 successively appeared on the leather 7, and finally extended over the whole surface of the leather 7, where the coloring was completed. The colored surface of the leather thus obtained had very highly minute full-color images. Moreover, since, in the case of the sheep leather, the leather itself relatively tends to absorb water, the inks were well permeated and it was possible to carry out sharp coloring without undesirable bleeding.

After this leather coloring was completed, the joined leather 7 and transport support member 8 were removed from the ink-jet leather coloring apparatus 6 and then the leather 7 was peeled from the transport support member 8. In this state, the coloring material fixing agent (a) having been sprayed on the leather 7 reacts with the dyes contained in the jetted inks to cause the dyes to turn water-insoluble. Hence, the leather was in the state feasible for its transfer to a usual finishing process.

Thereafter, the colored leather was transferred to a finishing process conventionally carried out. To carry out the finishing, the colored leather was first coated with a water-based polyurethane emulsion. Since, however, the dyes had already been made water-insoluble in water by the action of the coloring material fixing agent (a), no disturbance of images occurred at all. Subsequently, the leather was coated with a finishing material comprising nylon resin or casein, followed by a top coating with a lacquer to complete the process. Upon finishing in this way, the sheep leather was made into a leather product with a high print density and a multi-color design without any change in the handle of sheep skin.

EXAMPLE 6

Using as the same sheep leather as used in Example 5, but without imparting any coloring material fixing agent to the leather itself, the process up to the ink-jet leather coloring was carried out as it was, in the same manner as in Example 5. The sheep leather removed from the transport support member 8 after the leather coloring was completed had a colored surface where the inks had already dried and completely fixed. Subsequently, a coloring material fixing agent (b) shown below was prepared.

Coloring material fixing agent (b):

| | |
|---|---|
| Benzalkonium chloride | 2% |
| Polyallylamine hydrochloride (molecular weight: 50,000) | 5% |
| Water | 93% |

This coloring material fixing agent (b) was uniformly sprayed on the colored surface of the sheep leather by means of a spray gun so that the coloring material fixing agent (b) was in a solid content of 0.8 g/m$^2$, followed by drying at 50° C. for 3 minutes. In the case when the coloring material fixing agent (b) is imparted after the leather coloring, it is preferable for the treating solution to have a higher viscosity in view of the prevention of liquid dropping. Hence, in the present Example, the molecular weight of the cationic high-molecular substance was set higher.

Then, on the colored sheep leather thus treated, the finishing was carried out in the same manner as in Example 5. The sheep leather thus obtained had been finished while maintaining the state right after the leather coloring in respect to all of its handle, image density, image color tone and image bleeding.

EXAMPLE 7

As a leather, the same sheep leather as used in Example 5 was prepared. Next, a coloring material fixing agent (c) shown below was prepared. The ink-jet leather coloring apparatus as shown in FIG. 5 was modified into such a form that another ink-jet head unit was added to the ink-jet head 60, and accordingly such a form that another partitioned chamber was added also to the ink feeding assembly 61. The chamber added in the ink feeding assembly 61 was filled therein with the coloring material fixing agent (c) having the composition as shown, and was connected therefrom to the additional ink-jet head unit through a tube so that the coloring material fixing agent (c) can also be jetted in the same way as the four color liquid inks.

Coloring material fixing agent (c):

| | |
|---|---|
| Benzalkonium chloride | 1% |
| Polyallylamine hydrochloride (molecular weight: 10,000) | 1% |
| Thiodiglycol | 10% |
| Diethylene glycol | 10% |
| Water | 78% |

In this case, different from Examples 5 and 6, the molecular weight of the cationic high-molecular substance was set lower and also jetting assistant components were added, in order to make the viscosity of the solution as low as possible in view of the jetting of the coloring material fixing agent (c) also from the ink-jet head.

Under such construction, without imparting any coloring material fixing agent to the leather itself, the ink-jet leather coloring was carried out as is, in the same manner as in Example 5. When the cartridge was reciprocatingly driven for operating this leather coloring, the coloring material fixing agent (c) was also made to simultaneously jet out of the above additional ink-jet head unit to impart it to the coloring surface. In the case of such a form, the reaction of the inks with the coloring material fixing agent (c) almost simultaneously takes place on the coloring surface. Thus, the sheep leather removed from the transport support member 8 after the leather coloring was completed had a colored surface where the dyes had already been fixed.

On the colored sheep leather thus obtained, the finishing was carried out in the same manner as in Example 5. The sheep leather thus finished was obtained as a leather product colored with very highly minute images, without causing any problems in respect to all of its handle, image density, image color tone and image bleeding.

EXAMPLE 8

Using steer hide as a raw hide, this was subjected to a usual beamhouse process, followed by chrome tanning. Thereafter, the hide thus tanned was subjected to sammying and shaving and then coated with a white coating material comprising titanium oxide to obtain a white leather. The leather obtained was subjected to fatliquoring and drying, and prepared for leather coloring. In the case of this bovine leather, the leather has a certain hardness as its handle and is stretchable with difficulty. Hence, on the ink-jet leather coloring apparatus as shown in FIG. 5, it can be transported as is. Thus, in the present Example, the leather was directly set on the ink-jet leather coloring apparatus shown FIG. 5, without use of the transport support member 8 shown in FIG. 9. Before this leather was set on the following coloring material fixing agent (d) was applied on the grain of the leather so that the coloring material fixing agent (d) was in a solid content of 1.0 g/m$^2$ after drying for 3 minutes at 50° C.

Coloring material fixing agent (d):

| | |
|---|---|
| Benzyltributylammonium chloride | 3% |
| Polyamine sulfone (molecular weight: 50,000) | 6% |
| Water | 91% |

One end of the back (the flesh side) of the bovine leather 7 thus obtained was set fittingly to the platen 69 shown in FIG. 5 (its fitting portion is not shown). Thereafter, the leather coloring was operated in the same manner as in Example 5.

After this leather coloring was completed, the leather 7 was removed from the ink-jet leather coloring apparatus 6. In this state, the coloring material fixing agent (d) having been sprayed on the leather 7 reacts with the dyes contained in the jetted inks to cause the dyes to turn water-insoluble. Hence, the leather was in the state feasible for its transfer to a usual finishing process.

In this finishing process, firstly a water base finishing material mainly composed of casein, subsequently an inter-coating material comprising a synthetic resin and finally a top coating lacquer were each applied using a curtain coater, followed by pressing with an iron to complete the finishing. On the leather product thus finished, no disturbed images were seen, and also there was no feeling of changes in the handle at all, due to the impartment of the coloring material fixing agent before the leather coloring. Thus, a sharp multi-color colored leather product was obtained.

EXAMPLE 9

Figure 10:
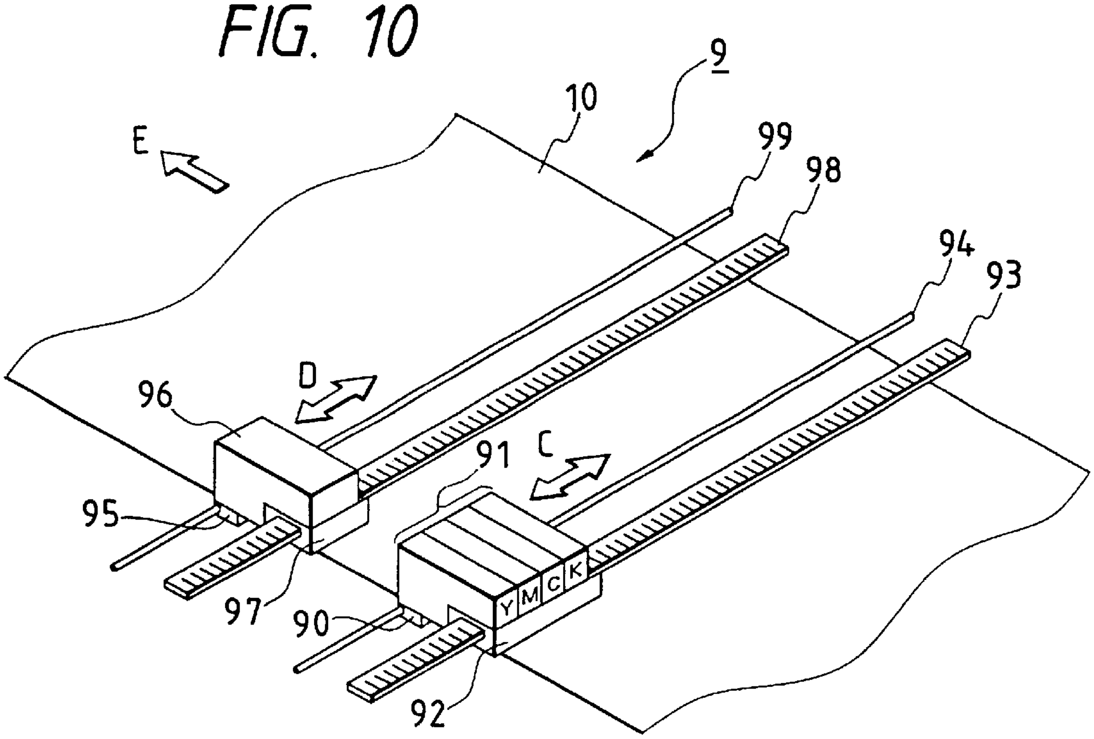
FIG. 10 illustrates the main constitution of an ink-jet leather coloring apparatus used in Example 9 of the present invention.

FIG. 10 partially illustrates an ink-jet leather coloring apparatus so constituted that the leather coloring and the jetting of the coloring material fixing agent can be operated in the same apparatus and also a series of such operations can be continuously made. Here, reference numeral 9 denotes an ink-jet leather coloring; and 10, a leather to be colored. This ink-jet leather coloring apparatus is operated basically in the same manner as in Example 5. The ink-jet head 90 from which inks are jetted is comprised of ink-jet head units arranged in four sets, provided with a plurality of nozzles in order. The ink-jet head 90 is also in the form of an integral type cartridge wherein the head units are directly joined with an ink tank 91 that holds inks. The inside of the ink tank 91 is partitioned into chambers respectively filled with black, cyan, magenta and yellow four color inks so that liquid inks can be directly fed to the ink-jet head 90 through no tubes. In FIG. 10, the chambers filled with the respective black, cyan, magenta and yellow color inks are marked with symbols K, C, M, Y, respectively. This ink-jet head 90 and the ink tank 91 are provided on a carriage 92. According to signals sent from a transmitter (not shown) to the ink-jet head 90, the carriage 92 is reciprocatingly moved to scan in the directions of arrows C shown in the drawing, along a guide rail 93 and a guide rail 94, and at the same time the downward jetting of inks from the ink-jet head 90 in accordance with image signals is started, and thus coloring can be made on the leather 10. Then, every time the carriage is reciprocatingly moved, the leather 10 is successively transported in the direction of an arrow E until the coloring is made on the whole surface. The inks used here were inks (I) to (L) each having the composition as shown below.

Ink (I):

| | |
|---|---|
| C.I. Food Black 2 (a dye) | 3% |
| Thiodiglycol | 10% |
| Ethylene oxide addition product of acetylene glycol | 0.05% |
| Water | Balance |

Ink (J):

| | |
|---|---|
| C.I. Acid Blue 9 (a dye) | 2.5% |
| Thiodiglycol | 10% |
| Ethylene oxide addition product of acetylene glycol | 0.05% |
| Water | Balance |

Ink (K):

| | |
|---|---|
| C.I. Acid Red 289 (a dye) | 2.5% |
| Thiodiglycol | 10% |
| Ethylene oxide addition product of acetylene glycol | 0.05% |
| Water | Balance |

Ink (L):

| | |
|---|---|
| C.I. Direct Yellow 86 (a dye) | 2% |
| Thiodiglycol | 10% |
| Ethylene oxide addition product of acetylene glycol | 0.05% |
| Water | Balance |

The respective inks were obtained by mixing all the components, stirring the mixture for 2 hours, and then filtering it using Fluoropore Filter FP-100.

Meanwhile, an ink-jet head 95 comprised of one ink-jet head unit and a tank 96 joined thereto are provided on a carriage 97 reciprocatingly movable in the directions of arrows D, which is provided in parallel to the reciprocating movement of the above carriage 92 and on the upstream side in the direction of the transport of the leather 10. This tank 96 is filled therein with the coloring material fixing agent (c) shown in Example 7, which is designed to be fed to the ink-jet head 95. In synchronization with the operation of the ink-jet head 90 carrying out leather coloring on the leather 10 and also in suitable timing, the carriage 97 is reciprocatingly moved along a guide rail 98 and a guide rail 99 at the same speed as the carriage 92. Here, the head 95 is so disposed that the coloring material fixing agent (c) is jetted downward from all the nozzles to the coloring surface of the leather 10. Thus, in this Example, both the inks and the coloring material fixing agent are jetted in perpendicularly downward direction.

Figure 11:
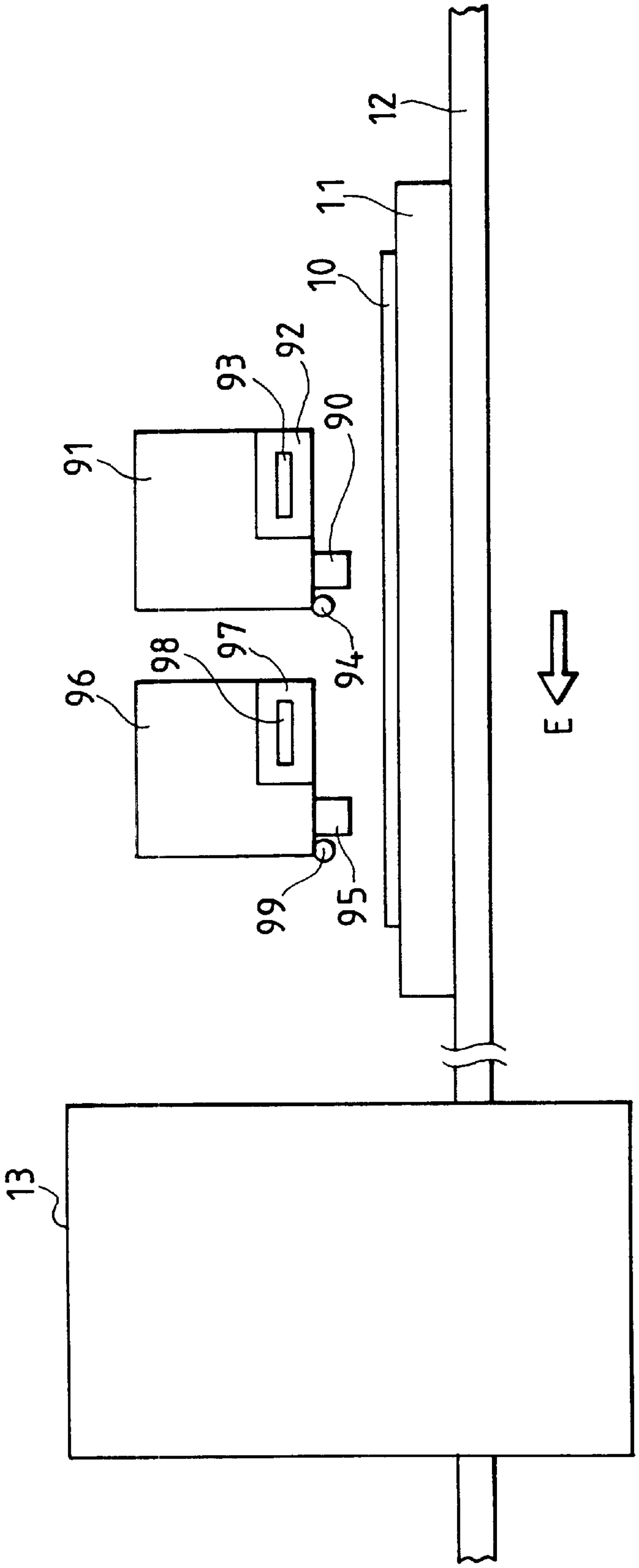
FIG. 11 illustrates how the ink-jet leather coloring apparatus of FIG. 10 operates.

The means for transporting the leather 10 has a mechanism as shown in FIG. 11, including the ink-jet leather coloring apparatus 9 shown in FIG. 10. More specifically, the transport means has an attraction device 11 for attracting the leather 10 on the side of the non-coloring surface by suction of air. This attraction device 11 has a mechanism that is moved along a rail 12 in the direction corresponding to a direction E in FIG. 11. To start the operation of leather coloring, the leather 10 is first put on the attraction device 11, and then the air suction is made for a certain time through a drive source (not shown) to firmly attach the leather by suction and at the same time make it flat to attain the state of attraction. Next, the attraction device 11 is forwarded in the direction of the arrow E until the forward end of the leather 10 approaches the ink-jet head 90, where the operation of leather coloring is started. Thereafter, every time the carriage 92 is reciprocated once, the leather 10 set on the attraction device 11 is successively forwarded in the direction of the arrow E by the coloring width of the ink-jet head 90. The coloring material fixing agent is jetted from the ink-jet head 99 in synchronization with this operation of coloring, during which the dyes in the inks jetted into the coloring surface are fixed and made insoluble. After a series of the leather coloring and the jetting of the coloring material fixing agent have been completed, the leather 10 set on the attraction device 11 is transported to a drying oven 13, where it is dried, e.g., at 50° C. for 3 minutes and thus unnecessary solvent components of the coloring material fixing agent are evaporated. After the attraction device 11 has gotten out of the drying oven 13, the attraction of the leather 10 is released to complete the operation.

Under such constitution, the leather coloring was carried out on the bovine leather obtained after the chrome tanning. The leather 10 having passed through the coloring apparatus was subsequently finished to a colored leather according to the same finishing process as in Example 8. Since the ink receiving layer had been formed before the leather coloring, the leather thus finished had images showing a very high faithfulness in details. Since also the coloring material fixing agent was imparted at the same time with the leather coloring, no disturbance of the images occurred in the finishing process. Also, in regard to the handle of leather, no problem was caused. Since the steps of leather coloring, impartment of the coloring material fixing agent and up to drying were operable in series, it became possible to shorten the treatment time.

When the leather coloring is carried out using such an apparatus, the leather can be set on with ease and also the process can be simply operated and surely carried out. In addition, the coating to form the ink receiving layer and the application of coating materials in the finishing process may be systematized so as to be carried out in the same flow, whereby the treatment of leathers can be effectively automated.

As described above, according to Examples 5 to 9 of the present invention, the representation of multi-color designs can now be realized by an ink-jet system, as well as the possible anxiety about water resistance in the finishing process has been settled at high level by applying the effective coloring material fixer. This has realized to provide the leather coloring apparatus that can obtain highly minute images with a high fastness, in addition to leather products with multi-colors.

Third Embodiment

Here, the constitution of the present invention for the second object of the specified technical subject mentioned above will be described.

The feature of the constitution of the present invention aims at establishing a leather coloring process or apparatus that can be effective when partial leather coloring or multi-color image formation is carried out on a leather by ink-jet means.

The third embodiment of the present invention is firstly a leather coloring process for forming an image on a leather by coloring, the process comprising;

a prior step of imparting to the surface of the leather an ink permeation controlling agent capable of reacting with a coloring material of an ink, at least at its area to which the image is to be formed by ink-jet coloring;

a coloring step of coloring the image on the surface of the leather by an ink-jet means, at least at its area to which the ink permeation controlling agent has been imparted; and a posterior step of imparting to the surface of the leather an image controlling agent capable of reacting with the coloring material of the ink in the leather, at least at its area to which the image has been colored by the ink-jet means.

As preferred embodiments in the above leather coloring process, the absolute quantity per unit area, of the image controlling agent imparted in the posterior step is larger than the absolute quantity per unit area, of the ink permeation controlling agent imparted in the prior step; the absolute quantity per unit area, of the image controlling agent imparted in the posterior step is smaller than the quantity per unit area, of the coloring material of the ink imparted in the leather coloring step; the total of the absolute quantity per unit area, of the ink permeation controlling agent imparted in the prior step and the absolute quantity per unit area, of the image controlling agent imparted in the posterior step is not smaller than the quantity per unit area, of the coloring material of the ink imparted in the leather coloring step; and the ink permeation controlling agent in the prior step is the same material as the image controlling agent in the posterior step.

The third embodiment of the present invention is also a leather coloring process for forming an image on a leather by coloring, the process comprising;

a posterior step of imparting to the surface of the leather an image controlling agent capable of reacting with the coloring material of the ink in the leather, at least at its area to which the image has been colored by the ink-jet means; and an absolute quantity per unit area imparted by the image controlling agent imparted in the posterior step is larger than the absolute quantity of said ink permeation controlling agent per unit area imparted by the prior step.

The third embodiment of the present invention is further a leather coloring process for forming an image on a leather by coloring, the process comprising;

a prior step of imparting to the surface of the leather an ink permeation controlling agent capable of reacting with the coloring material of the ink in the leather, at least at its area is colored by the ink-jet means; and an absolute quantity per unit area imparted by said ink permeation controlling agent imparted in said prior step is less than the absolute quantity of the image controlling agent per unit area imparted by said posterior step.

The leather and the coloring referred to in the third embodiment of the present invention also are as defined above.

The third embodiment of the present invention is also a leather coloring process for forming an image on a leather by coloring, the process comprising;

a coloring step of coloring the image on the leather by an ink-jet means; and a modifying step of substantially modifying the image formed on the leather by the ink-jet means;

the steps being substantially continuous in this order.

As preferred embodiments in the above leather coloring process, the modifying step is a substantially continuous step comprised of at least one modifying step carried out using an ink-jet means; the modifying step comprises finishing coating; a compulsory drying step is provided between the coloring step and the modifying step; the ink-jet means is an ink-jet recording system; the leather comprises a leather prepared by subjecting a hide or skin to a tanning step including a retanning step, followed by neutralization, fatliquoring, sammying, setting-out and drying, and further followed by conditioning, staking, stretch drying and trimming to smoothen the leather and provide its handle; and the ink is jetted by the ink-jet means to at least one of grain side and flesh side of the leather.

In the present embodiment of leather coloring, when the leather coloring is referred to, it may include the finishing coating conventionally carried out. In such a case, coating compositions does not necessarily contain coloring materials. However, the form of presence of non-volatile components contained therein can be considered to be similar to the form of presence of the coloring material described above.

The constitution in embodiment have been made extensive further studies on the behavior of coloring droplets, namely ink, having reached leather. As a result, they have discovered the following. That is, they have discovered that, in order to make image quality uniform, i.e., make colors uniform and make dot forms round, it is necessary to keep constant the depth of permeation of ink in the thickness direction of leather, and also, after the coloring with ink has been completed, in order to impart sufficient color forming properties and stability to the images thus formed, it is important to make a coloring material appropriately react at the image, in image formation using an ink-jet means, in particular, image formation by ink-jet system.

In order to control the permeation of ink optimum to a desired form in the thickness direction or the manner of apparent spread of ink in the surface layer, i.e., the state of run of ink in the surface layer, it is effective to control the time after the ink has reached the leather, then the solvent or dispersion medium for the coloring material which is a constituent of the ink evaporates, and until the coloring material is solidified and the coloring material molecules are stopped to move in the leather to be stabilized there. Since, however, water is usually in wide used as the solvent or dispersion medium, it takes a certain time after the ink has reached the leather and then evaporates. Before such evaporation is completed, the ink continues to permeate and run inside the leather, and concurrently the coloring material also continues to do similarly. Such behavior of ink is also affected by the presence or absence of any adjacent ink dots and the difference in its location inside the leather. Hence, the state of presence of the coloring material in individual dots becomes non-uniform. After that stage, what is meant by the permeation of ink is the permeation of ink in the thickness direction of leather, and what is meant by the run of ink is the apparent spread of ink in the surface layer of leather.

In order to prevent such non-uniformity, it is preferable to accelerate the evaporation of water in ink. For such purpose, one may contemplate addition of heat to the ink having reached the leather. This, however, is not a preferable method when a weakness of leather to continual high temperature is taken into account. Thus, in the above controlling of the permeation or run of ink, the physical method utilizing heat may preferably be replaced with a chemical method by which the coloring material itself contained in ink, when the ink reaches the leather, urges the solvent or dispersion medium in the ink to complete the reaction of insolubilization or aggregation within the desired time.

After the leather coloring also, in order to impart sufficient color forming properties and stability to the images, it is effective for the coloring material to have been well fixed in the leather. In an attempt to attain such effect, any means such as tanning and fatliquoring for causing the whole leather to undergo uniform changes in physical properties may bring about, except those carried out on some particular leathers, a difficulty in regard to the selection of treating methods, the prevention of an ill effect to the handle inherent in the leather, and so forth. However, if such changes are made only on the colored area of the surface, such a difficulty can be eliminated. It is preferable to make the coloring material in ink chemically fast, firm or stable, in leather including surface parts of its around, i.e., what is called “fix” it by such means.

Accordingly, in order to stably form images, they have reached the means that a component capable of chemically reacting with the coloring material contained in inks is imparted to the coloring or colored area on the surface of the leather before and after the step of ink-jet leather coloring carried out by jetting the inks. Namely, taking account of the fact that those having ionic properties are widely used in either coloring materials contained in inks for ink-jet system or coloring materials used in conventional dyeing on leathers, the coloring material is caused to undergo chemical reaction due to chemical bonding. Then, the images herein include both of those formed on the whole surface of the leather and those formed on only part of the leather. In the following description, an anionic dye most widely used as a coloring material and having many kinds represents the coloring material, and ionic bonding with anionic dyes represents the chemical reaction.

Such an anionic dye are described in the second embodiment, which are omitted there. Needless to say, cationic coloring materials can be readily used if the ionic properties in the following description are considered in reverse.

In the third embodiment, in order to control the penetration and run of ink with respect to leather, an ink permeation controlling agent is imparted to the leather as a step prior to the leather coloring. As a result, in the course the ink permeates or runs after it has reached the leather in the subsequent coloring step, the reaction of ion bonding is caused between the coloring material contained in the ink and the ink permeation controlling agent, so that the coloring material is made insoluble in the solvent or dispersion medium constituting the ink or turned to have the nature of dispersion break. Bringing the degree of ionic bonding between the coloring material and the ink permeation controlling agent into the desired state enables adjustment of the form and density of individual dots constituting the images. Here, the degree of ionic bonding can be changed according to the amount of the ink permeation controlling agent imparted, or the degree of ionization, i.e., the number of charged sites in the structure of substance used as the ink permeation controlling agent.

The ink permeation controlling agent may preferably be those cationic in opposition to the anionic dyes. Preferred materials therefor are materials satisfying that they are easy to handle, can be readily made present inside the leather and can maintain cationic properties inside the leather. For example, they may be selected from water-soluble cationic substances. To impart such a cationic substance to the leather, the substance may be first formed into an aqueous solution and then may be coated or sprayed onto the leather. Thereafter, this aqueous solution gradually permeates inside the leather and spreads from the coloring surface of the leather to its inside, and at the same time the solvent water continues to evaporate. At this stage, the probability of presence of the cationic substance in the thickness direction of the leather becomes larger toward the surface.

Here, the coloring material and the cationic substance function in contact with each other, and hence the absolute quantity per unit area, of the ink permeation controlling agent on the leather surface in the prior step may be made smaller than the absolute quantity per unit area of the ink on the leather surface, where they can well function. This also causes no adhesion of unwanted substances to the leather, and hence it becomes possible to control the permeation of the coloring material without damaging the handle inherent in the leather and also without inhibiting the dyeability of the coloring material in the leather itself. Also, because of such action, there can be no particular limitations on the time after the ink permeation controlling agent has been imparted and before the ink-jet leather coloring is carried out. For example, the ink-jet leather coloring may be carried out after the ink permeation controlling agent has been imparted and then sufficient drying has followed. Alternatively, the ink-jet leather coloring may be carried out after the ink permeation controlling agent has been imparted and in the course the solvent evaporates, i.e., right before the ink-jet leather coloring, or at the same time when it is imparted. Any of these may be employed.

Through the above prior step and the leather coloring step, images are formed on the leather surface. If the images are left as they are, highly minute images are kept in the finishing process subsequently carried out after the leather coloring and the subsequent processing into leather products. Hence, in order to further add color forming performance and stability to the images for keeping desired images, the image controlling agent is imparted to the colored leather as a step posterior to the leather coloring. Because of this image controlling agent thus imparted, the fixing of the coloring material in the leather colored area where the images have been formed on the leather is made stronger on account of its reaction with the coloring material due to ion bonding, so that the images colored are stabilized. Thus, the area to which the image controlling agent is imparted may be limited only to the colored area.

The action occurring here is also attributable to the contact of the coloring material with the cationic substance, similarly with an ink permeation controlling agent, and hence there can be no particular limitations on the time after the leather coloring has been carried out and before the image controlling agent is imparted. For example, the image controlling agent may be imparted after the ink-jet leather coloring has been carried out and then sufficient drying has followed. Alternatively, the image controlling agent may be imparted in the course the inks permeate during the coloring, i.e., right after the ink-jet leather coloring. Any of these may be employed.

In the posterior step, however, it is required for the image controlling agent to well combine with coloring material molecules, and hence the image controlling agent must be imparted in a sufficient quantity. Hence, an absolute quantity S1 per unit area on the leather surface to which the ink permeation controlling agent has been imparted as the prior step and an absolute quantity S2 per unit area on the leather surface to which the image controlling agent has been imparted as the posterior step may preferably be in a relative relationship of $S1<S2$ in order to accomplish a more effective action on the image formation. In order to make the action in the prior step and posterior step more efficient also on various leathers or images, $S1+S2\geqq D$ may be preferable. On the other hand, the absolute quantity S1 applied in the prior step is concerned with an absolute quantity D per unit area on the leather surface in which the coloring material in an ink will be imparted at the subsequent coloring step. Namely, a permeation conditions of the coloring material inside a leather can be changed by contacting them each other, but at that time $S1<D$ is preferable for making desired conditions without inhibiting an ink penetration. The image controlling agent thus imparted may cause no damage on the handle of the leather since it leaves no unreacted sites in the coloring material and also functions in a well small quantity with respect to the weight of the leather when imparted in either quantity.

As described above, in both the ink permeation controlling agent and the image controlling agent, the cationic substance is used for the purpose of causing them to ionically react with the coloring material. The cationic substance may specifically be exemplified by the following.

First, cationic low molecular substances exemplified in the second embodiment may be selected from substances including surface active agents capable of accelerating the permeation of liquid, which are disclosed in second embodiment of the specification.

Also, those capable of increasing the bonds to the coloring material, the aggregation and also the apparent coloring material molecules may be selected from cationic high molecular substances, as exemplified in the second embodiment.

These ink permeation controlling agents and image controlling agents may be respectively imparted alone or in combination of two or more kinds under appropriate selection from the groups of substances exemplified in the above, so as to be suited for the leather on which images are to be formed. Since the ink permeation controlling agent and the image controlling agent are both those for causing the ionic bonding reaction, they may have composition different from each other or may have the same composition. Known surface active agents and binders of various types may also be optionally added thereto so that their viscosity, volatility and so forth can be adjusted according to the functions required and the kinds of leathers used.

These may be imparted by methods such as coating and spraying. As specific means therefor, it is possible to use a roll coater or a spray gun, which enables easy adjustment of the quantities of solutions to be imparted, or a jetting means comprising an ink-jet head.

And derived from the constitution described above, there is also an invention in the further developed mode. Namely, it is not necessary to provide a specified restriction on the time of from the prior step to the coloring step and the time of from the coloring step to the posterior step. Rather it is important for carrying out the reaction described above that the treating agent used in a prior or posterior step has surely been applied on a leather and images. It is not always necessary that prior, coloring and posterior steps are continuously connected at one site. Therefore, it is one of the present invention to carry out a posterior step to apply an image controlling agent at different site or on a different day to a colored leather to which a prior step to apply ink permeation controlling agent and a coloring step by an ink-jet means have been finished previously than those site and day in which have been carried out. It is also another aspect of the present invention to carry out prior step on a leather that is set to be subjected to a coloring step by an ink-jet means and a posterior step to apply an image controlling agent at different site and on different day from a site and day on which these steps on and after coloring step will be carried out.

The Examples concerning the third embodiment described above relate to the following fourth embodiment. Then, the relationship between them will be explained in the following.

Fourth Embodiment

The constitution of the present invention for the third object of the above described specified technical subject is a leather coloring process for forming an image on a leather by coloring, the process comprising a coloring step of coloring the image on the leather by an ink-jet means, and a modifying step of substantially modifying the image formed on the leather by the ink-jet means; the steps being substantially continuous in this order.

The above process is also a leather coloring process characterized in that the modifying step is a substantially continuous step comprised of at least one modifying step carried out using an ink-jet means; the modifying step comprises finishing coating; a compulsory drying step is provided between the coloring step and the modifying step; the ink-jet means is an ink-jet system; and, in particular, the leather used in the present invention comprises a leather prepared by subjecting a hide or skin to a tanning step including a retanning step, followed by neutralization, fatliquoring, sammying, setting-out and drying, and further followed by conditioning, staking, stretch drying and trimming to smoothen the leather and provide its handle; and the ink is jetted by the ink-jet means to at least one of grain side and flesh side of the leather.

These features have been derived taking note of the technical subject of conventional operations for long terms of time from dyeing to coating steps, and a clue for its improvement has been found from what are required in conventional various steps of from dyeing to finishing. In conventional steps, both dyeing and coating are commonly carried out using treating solutions. Taking account of this point, the step of leather coloring is now carried out by ink-jet means, i.e., ink-jet system, and thus the treatment method has been made simple and substantially continuous. Moreover, it has become possible to stably produce highly minute multi-color images.

The ink-jet head commonly used in ink-jet system in operation is made to scan at a constant rate, during which drive signals are given to individual nozzles and the jet timing of ink droplets and the jet quantity are controlled for each nozzle. Namely, a leather having been subjected to a beamhouse process and up to tanning and retanning is, without dyeing, further subjected to fatliquoring, setting-out, conditioning and so forth to previously smooth the leather and provide its handle, followed by the step of leather coloring to form images by coloring according to ink-jet system and the subsequent finishing coating, i.e., the modifying step to modify the image-formed surface, which can be carried out as substantially continuous steps.

More specifically, in the ink-jet leather coloring, ink is jetted to only the portion where images are to be formed, and is caused to adhere to and permeate in the leather, and hence the coloring material in ink by no means adhere to the portion unrelated to images. Thus, the surface state or handle of leather or the state of drying show no great change before and after the leather coloring, and hence it becomes possible to carry out modifying, i.e., coating by ink-jet system, subsequent to the step of leather coloring. This brings about the function to improve efficiency and productivity, decreases the load on the drying for removing the solvent that must be carried out because of use of dyeing liquid in a large quantity, and also, in regard to the quantity of treating solutions, enables delicate control of ink droplets jetted from the nozzles of the ink-jet head. Hence, it has been accomplished to eliminate waste concerning the quantity of solutions, and to simplify the adjustment of coating thickness at the time of coating and shorten the time therefor. Stated additionally, since the leather coloring can be carried out using inks in a quantity corresponding to necessary minimum coloring materials, it is almost unnecessary to thereafter wash away unreacted coloring materials, and it becomes possible to effectively utilize coloring materials. Since also the quantity of modifying solutions can be arbitrarily set and also can be controlled in constant quantity, and no occurrence of drawback is there that the handle and glossiness of leather are by no means damaged. This makes it possible to freely and also simply carry out the multi-coloring and shading that could not be accomplished by conventional methods. When the ink-jet leather coloring is carried out, in order to maintain stable image quality, it is important to always keep stable the distance between the coloring surface and the ink jet orifice of the ink-jet head. As a measure therefor, the setting-out hitherto carried out in the finishing process is carried out before the leather coloring. Hence a leather having been made smooth can be set on the leather coloring apparatus and can be brought into a very desirable state for the ink-jet leather coloring. Besides, since the conditioning, staking and stretch drying are completed before the leather coloring to previously take off the stiffness of leather, the step of taking off stiffness which has been carried out in the finishing process is no longer necessary, so that the images formed by leather coloring can be prevented from being disturbed.

Meanwhile, the coating has hitherto aimed at the protection of the leather surface, and the modifying treatment may be applied to the whole surface of the area where the images are present, or may be applied in part in accordance with uses of the leather or colored images. In this regard also, the ink-jet recording system enables easy control. It is also easy to change the kinds of treating solutions fed to the respective ink-jet heads or to change the kind of treating solution for each nozzle so that the modifying solutions can be properly used.

In the conventional coating, it has been common to carry out wet-on-wet coating using several kinds of finishing materials in order to obtain finished leathers in the desired state. This also can be done by arranging in a raw a plurality of ink-jet modifying steps and carrying them out continuously. The coloring material may also be contained in the image modifier according to uses of leather products so that the steps can be incorporated as a similarly continuous treating means.

In this way, continuous leather coloring steps can be carried out by using the ink-jet means, i.e., the ink-jet system, so that the time taken for the respective steps can be shortened and the process can be automated. However, some treating solutions used in the respective steps may make the treated surface not well treated, in the course after the ink jetting to leather and before the step subsequent thereto. In such a case, it is effective to optionally provide a compulsory drying step between the respective steps. This step is effective when provided between the leather coloring step including the prior and posterior steps and the modifying step, which have functions different from each other. This step is also effective as heat treatment to strengthen the bond between leather and tanning agents, fatliquoring agents or the like, and makes leather proteins less hydrophilic to strengthen the bond between leather and treating agents. In such a drying step, appropriate temperature and time may be set in accordance with thermal resistance of leathers, and there are no particular limitations. Since, however, as previously stated, the treatment carried out by ink-jet system makes it easy to avoid unnecessary impartment of treating solutions, these drying steps can satisfactorily function even when simply constructed.

Meanwhile, in the dyeing commonly carried out on leather, the matter is argued on the bonding between the protein collagen, which is the main component of leather, and the dye molecules. In such bonding, dyed sites are present inside the leather and more increase through tanning, and hence the leather can be said to be essentially dyeable with ease. Hence, on either the grain side or flesh side of leather, the permeability of ink can be considered similar. Thus, when the leather coloring process of the present invention is applied, it can be applied to all of any one side and both sides, in regard to the grain and the flesh side.

In the fourth embodiment, there is a constitution of the present invention totally embodied therefrom is an apparatus for carrying out the leather coloring process according to the invention, which comprises an ink-jet means for carrying out coloring on a leather to form an image on the leather, and a modifying means for imparting to the leather an image modifier capable of substantially modifying the image by the ink-jet means. It is also a leather on which an image has been formed by the leather coloring process described above, and a leather product obtained by processing such a leather.

Subsequently, it is a leather coloring process for forming an image on a leather by coloring, the process comprising;

a directly prior step of imparting to the surface of the leather an ink permeation controlling agent capable of reacting with a coloring material of an ink, at least at its area to which the image is to be formed by coloring;

a coloring step of coloring the image on the surface of the leather by an ink-jet means, at least at its area to which the ink permeation controlling agent has been imparted;

a directly posterior step of imparting to the surface of the leather an image controlling agent capable of reacting with the coloring material of the ink in the leather, at least at its area to which the image has been colored by the ink-jet means; and a modifying step of substantially modifying the image formed on the leather by the ink-jet means;

the steps being substantially continuous in this order.

The leather coloring process in the third embodiment described above can be achieved by using such apparatus.

When, in order to totally achieve the present invention described above, the leather coloring step and the modifying step are carried out by an ink-jet system as substantially continuous steps, the leather is successively processed while the ink-jet heads used are made to scan at a constant period and concurrently the leather itself is moved, so that the coloring can be successively transferred from one treated area to the subsequent treating area. More specifically, the prior step and posterior step of the leather coloring step as described in the first mode according to the third embodiment of the present invention can be included into these continuous steps at the same time. That is, it is possible to set up a leather coloring process wherein the directly prior step of imparting the ink permeation controlling agent, the leather coloring step, the directly posterior step of imparting the image controlling agent and the modifying step are made substantially continuous in this order.

EXAMPLE 10

Figure 12:
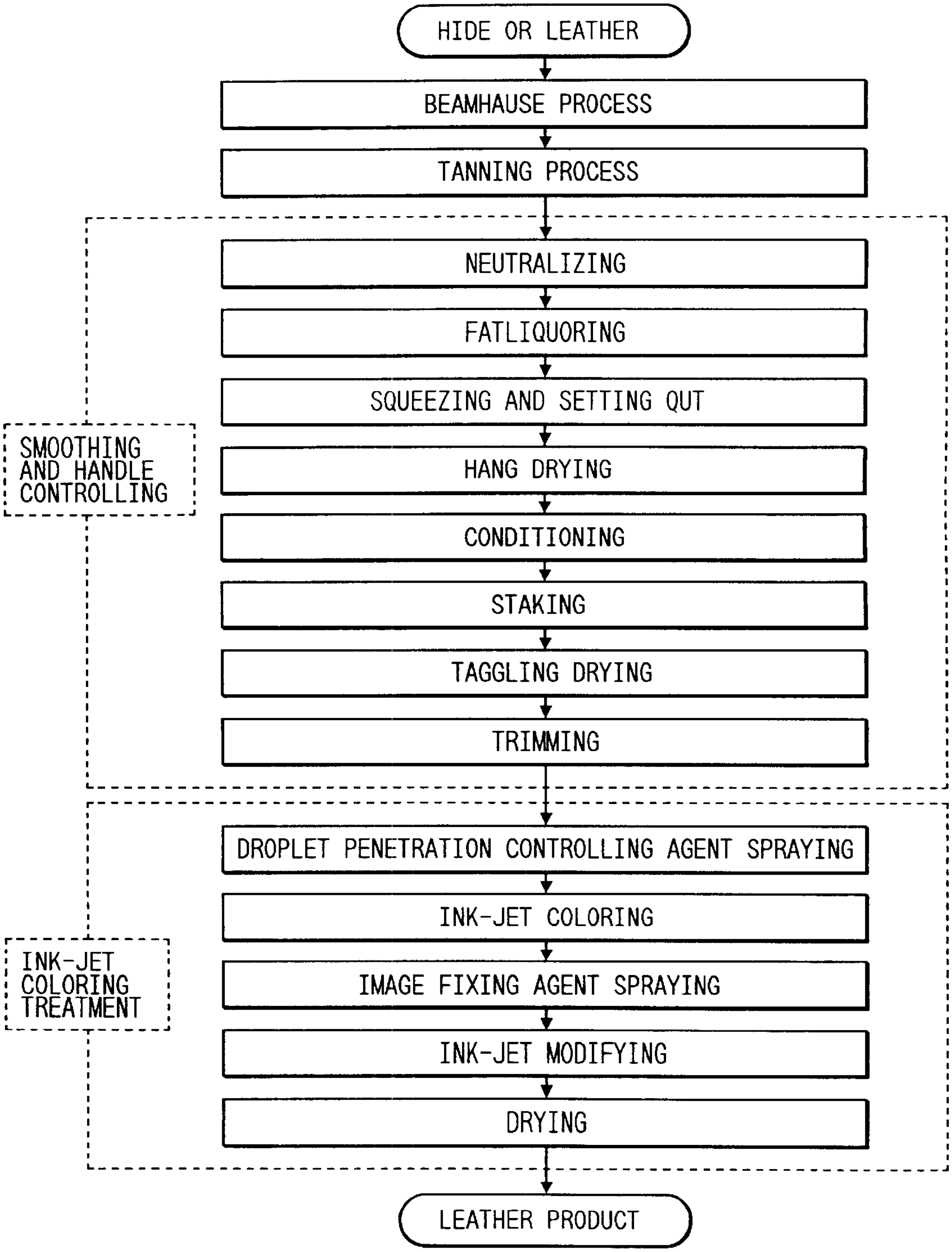
FIG. 12 is a flow chart to show a process comprising preparation of leather and leather coloring and modification on the leather until a leather product is obtained in Example 10 of the present invention.
Figure 13:
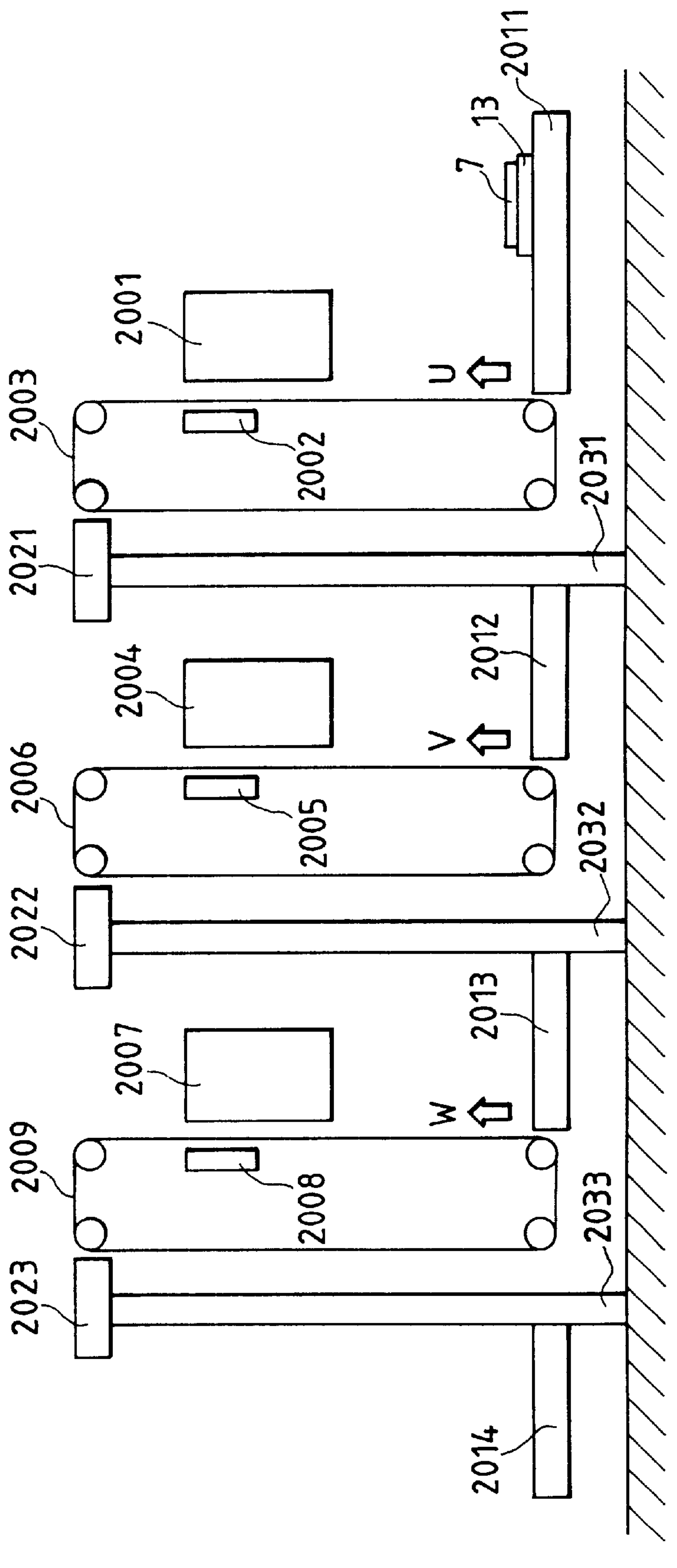
FIG. 13 illustrates the whole constitution of another embodiment of the ink-jet leather coloring apparatus used in a process of FIG. 12.

FIG. 12 is a flow chart to show a process comprising the preparation of leather and the leather coloring and modification on the leather until a leather product is obtained according to the present invention. FIG. 13 illustrates the whole constitution of an embodiment of the ink-jet leather coloring apparatus according to the present invention.

In FIG. 12, the beamhouse process and the tanning process are processes of preparing leather from raw hide or skin by a method conventionally employed. In the present Example, sheep skin was used as a raw skin, and this was subjected to chrome tanning and to whitening using titanium oxide. The sheep leather thus prepared was subjected to neutralization with sodium bicarbonate by using a drum, and to fatliquoring in the drum, with a fatliquoring solution mainly composed of sulfited cod oil to impart softness. In conventional processes, a dye liquid is added in the drum to carry out dyeing at the same time with fatliquoring, but in the present invention no dyeing is carried out in this step. Subsequently, using a setting machine, the leather was subjected to the steps of sammying and setting-out to squeeze out the excess water having permeated in the leather during the neutralization and the fatliquoring, and to set out it in an appropriate size, followed by hang drying, conditioning and staking to take off the stiffness of the leather and impart softness thereto. Thereafter, the sheep leather was subjected to toggling and trimming so as to have a flat form suitable for its setting on the ink-jet leather coloring apparatus, and also to fix the fatliquoring agent and attain a suitable water content in the leather.

After the steps up to this stage were completed, the leather was transferred to the respective steps for the leather coloring utilizing the ink-jet system. Here, in order to efficiently carry out these steps, the sheep leather was set on the transport support member 8 shown in FIG. 9. This transport support member 8 was a member comprising a flat steel sheet 81 made of stainless steel coated on the whole surface on one side with an adhesive 82 having a relatively weak adhesiveness.

The sheep leather was firmly attached in this way with its grain side outside, and firstly an ink permeation controlling agent shown later was sprayed on its grain using a spray gun so as to be in a coverage of 1 g/m$^2$ after dried. After this spraying, it was followed by drying at room temperature and normal humidity for about 1 hour.

Figure 14A:
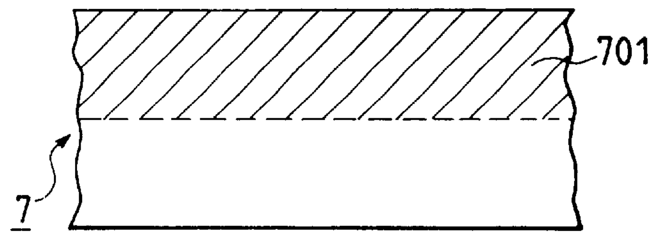
FIGS. 14A to 14C are diagrammatic views to show the behavior of ink droplets in leather when ink is imparted to the leather by the ink-jet leather coloring process in a process of FIG. 12.

Thereafter, using an ink-jet leather coloring apparatus, images were formed on the grain thus treated. The sheep originally has a relatively good water absorption. Hence, in this spraying also, the components thereof fastly permeated into the leather, and it was possible to well apply the treatment without use of any particular drying means for raising the temperature. Also, since the ink permeation controlling agent contained a surface active agent, it was possible to accelerate the permeation of the whole sprayed solution into the leather. Thus, after drying, the components in the ink permeation controlling agent were not in the state where they formed a layer on the surface but in the state they had permeated into the leather as diagrammatically shown in FIG. 14A. In FIG. 14A, reference numeral 7 denotes the leather, and 701, the ink permeation controlling agent sprayed on the leather and having permeated into it. Since such a state can be maintained, the surface state of the coloring region can be kept in substantially the same state as that before the spraying of the ink permeation controlling agent. Hence, when the leather coloring is operated, the ink permeation controlling agent neither inhibits the ink itself from adhering to the surface nor causes a change in the handle of the whole leather.

Subsequently, on the leather 7 thus treated, images were formed by ink-jet coloring using the ink-jet leather coloring apparatus as shown in FIG. 5.

Figure 14B:
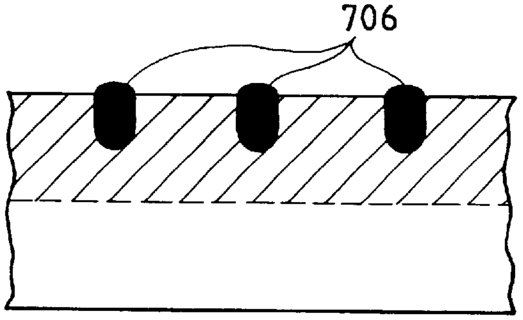
Figure 15A:
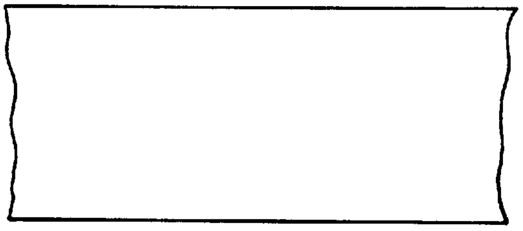
FIGS. 15A and 15B are diagrammatic views to show the behavior of ink droplets in leather when ink is imparted to the leather not by the process of FIG. 12.
Figure 15B:
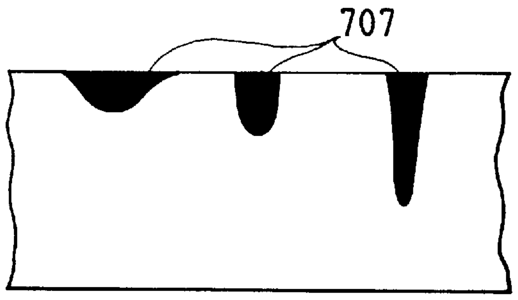

The state of permeation of the jetted ink droplets into the leather 7 is shown in FIG. 14B when coloring is carried out by an operation of an ink-jet coloring apparatus. The respective ink droplets thus jetted to the leather 7 and having permeated into it can maintain, as denoted by reference numeral 706, the depth of permeation into the leather and the extent of spread on the surface in the area where the ink permeation controlling agent has permeated. As a result, a uniformity in the formation of images can be achieved at the time of ink-jet coloring. On the other hand, when the ink-jet recording is carried out on a sheep leather shown in FIG. 15A, using the ink-jet leather coloring apparatus shown in FIG. 5, in the same way but without imparting any ink permeation controlling agent, the state of permeation of ink droplets becomes as shown in FIG. 15B. Thus, the state of ink droplets, as denoted by reference numeral 707, is in variety even on the same leather, in regard to the depth of permeation into the leather and the extent of spread on the surface, resulting in non-uniformity in image formation.

Figure 14C:
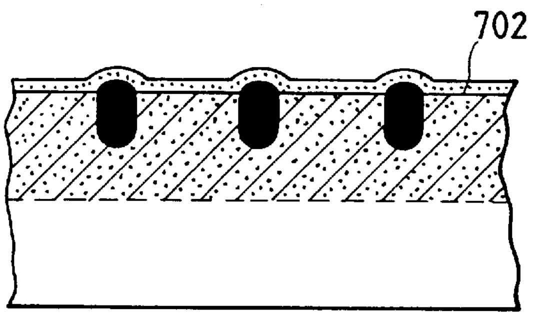

After such leather coloring was completed, an image controlling agent as shown below was subsequently sprayed on the grain of the sheep leather having the images thus formed, in the same way as in the spraying of the ink permeation controlling agent using a spray gun so as to be in a coverage of 2 g/m$^2$ after dried. Then the spraying was followed by drying at room temperature and normal humidity for about 1 hour. At this stage, in order to achieve bonding to the coloring material participating in the image formation and to cause its aggregation in greater molecules, the molecular weight of ionically reactive polyallylsulfone was made larger than that of the ink permeation controlling agent previously imparted. As a result of the spray of this image controlling agent, as shown in FIG. 14C, its solution gradually permeates into the leather from its side on which images are formed, i.e., from the grain side. In the course of this permeation, benzalkonium chloride having a relatively high permeability is first ionically bonded to the coloring material present in the part where the images are formed, and then this bonding starts to cause the polyallylsulfone and the coloring material, dissolving together, to combine. Through such reaction, the molecules of the coloring material become apparently greater, so that it becomes possible to block the coloring material from migrating in the leather, to stabilize its color formation, and at the same time to make the coloring material insoluble in water. In other words, images can be stabilized and also water resistance comes to be exhibited.

Ink permeation controlling agent:

| | |
|---|---|
| Benzalkonium chloride | 3% |
| Polyallylsulfone (molecular weight: 10,000) | 3% |
| Water | 94% |

Image controlling agent:

| | |
|---|---|
| Benzalkonium chloride | 1% |
| Polyallylsulfone (weight average molecular weight: 50,000) | 5% |
| Water | 94% |

The images formed by ink-jet leather coloring carried out on the sheep leather through the above process were comprised of ink dots with uniform shapes and were stable images with a high density. The images were also contributory to an improvement in fastness such as water resistance, which could be well satisfactory for finishing coating carried out in the next step.

Image formation on the sheep leather was thus completed through the steps up to this stage. Subsequently, the sheep leather having the images thus formed thereon was transferred to the modifying step to carry out finishing coating.

FIG. 13 diagrammatically illustrates continuous steps used when the modifying treatment is applied to the sheep leather. As shown in FIG. 13, the modifying steps are set up in three stages, i.e., finishing coating for undercoating, intercoating and topcoating is carried out through continuous steps of jetting image modifiers by the ink-jet system. As coating solutions used in these steps, coating solutions usually used in spray coating may be used. For example, urethane type, acrylic or casein type ones may be used optionally in appropriate combination. The steps of modifying the sheep leather will be described below with reference to FIG. 13. In this description, the first, second and third modifying steps are called undercoating, intercoating and topcoating, respectively.

First, a transport support member 13 comprising a stainless steel sheet, on which the leather 7 having the images thus formed thereon is firmly attached, is set on a transfer means 2011 so constituted as to be transferable in the left direction as viewed in the drawing. Thereafter, the transfer means 2011 transfers the transport support member 13 to the lower end as viewed in the drawing, of a sub-scanning belt 2003 extending toward a first modifying section 2001 by means of a drive source (not shown). At the time the transport support member 13 has reached that lower end of the sub-scanning belt 2003, the transport support member 13 is successively turned upright by 90 degrees, and the back of its stainless steel sheet is fitted to the surface of the sub-scanning belt 2003. Here, the transport support member 13 is so designed as to be engageable with the sub-scanning belt 2003 so that the leather 7 can be moved to an undercoating solution jetting zone of the first modifying section 2001. Thereafter, the sub-scanning belt 2003 is driven to move at an even speed in the direction of an arrow U, and concurrently the transport support member 13 is moved upwards as viewed in FIG. 13 to transport the leather 7 to the undercoating solution jetting zone. As the leather is thus transported, an undercoating solution is jetted out at the jetting zone, and the undercoating on the leather in started at one and of the leather 7 while being supported with a platen 2002 at its back facing through the sub-scanning belt 2003. After the undercoating on the whole surface of the leather has been completed, the sub-scanning belt 2003 is further continued to drive, and the leather reaches the flat top portion as viewed in the drawing, on the sub-scanning belt 2003, until the transport support member 13 approaches a leather elevator stand 2021. Then the transport support member 13 is disengaged from the sub-scanning belt 2003, and moved to the leather elevator stand 2021. The leather elevator stand 2021, having received the transport support member 13, is automatically driven to descend along a support rod 2031, and then moves the transport support member 13 to a transport means 2012.

Thereafter, the intercoating is successively carried out in a second modifying section 2004 on the leather 7 having been subjected to the undercoating, where the treatment is operated in the same way as in the first modifying section 2001. That is, the transport support member 13 is fitted to a sub-scanning belt 2006, which is moved at an even speed in the direction of an arrow V, and at the time it has approached a coating solution jetting zone of the second modifying section 2004, an intercoating solution is jetted. It is then placed on a leather elevator stand 2022, which is driven to descend along the support rod 2032, and thus moved to a transport means 2013. Similar operation is further repeated, where topcoating is carried out in a third modifying section 2007, the transport support member 13 is finally transported to a forward end of a transporting means 2014. Thus, the modifying of the leather 7, i.e., the finishing coating is completed.

In a series of these operations, the treatment in the first modifying section 2001, the second modifying section 2004 and the third modifying section 2007 each is carried out by the ink-jet system. With regard to the mechanism and operation in these sections, the same ink-jet coloring apparatus as shown in FIG. 5 may be used, and hence the description thereon is omitted here. The direction B in FIG. 5 corresponds to each of the directions U, V and W in FIG. 13. In the case of the present modification treatment, the ink feeding device 61 in the ink-jet leather coloring apparatus of FIG. 5 may be formed in one chamber, which may be filled with the coating solution used in each treatment, and the apparatus may be operated in the same way as in the leather coloring.

In the present Example, the leather is moved between the steps of undercoating to topcoating. Since these are included in a series of operations, the leather is not removed or transported outside even at the portions where the coating solution takes turn, and there is no portions manually handled. Since the leather is automatically moved through these steps, energy savings can be achieved when compared with conventional cases. In the movement between the above steps, it necessarily takes a certain time to transport the transport support member 13 on which the leather is set on, but such a time can be made effective for follow-up of the treatment applied right before it, i.e., drying of coatings.

All the operations are thus completed, so that highly minute images can be formed on the leather, no deterioration of images may occur in the finishing coating, and also the treatment time can be shortened. In the subsequent steps, since the features required in the leather to be formed into leather products have been brought out, the leather can be weighed, variously stitched, and finished into leather products such as bags.

EXAMPLE 11

Figure 16:
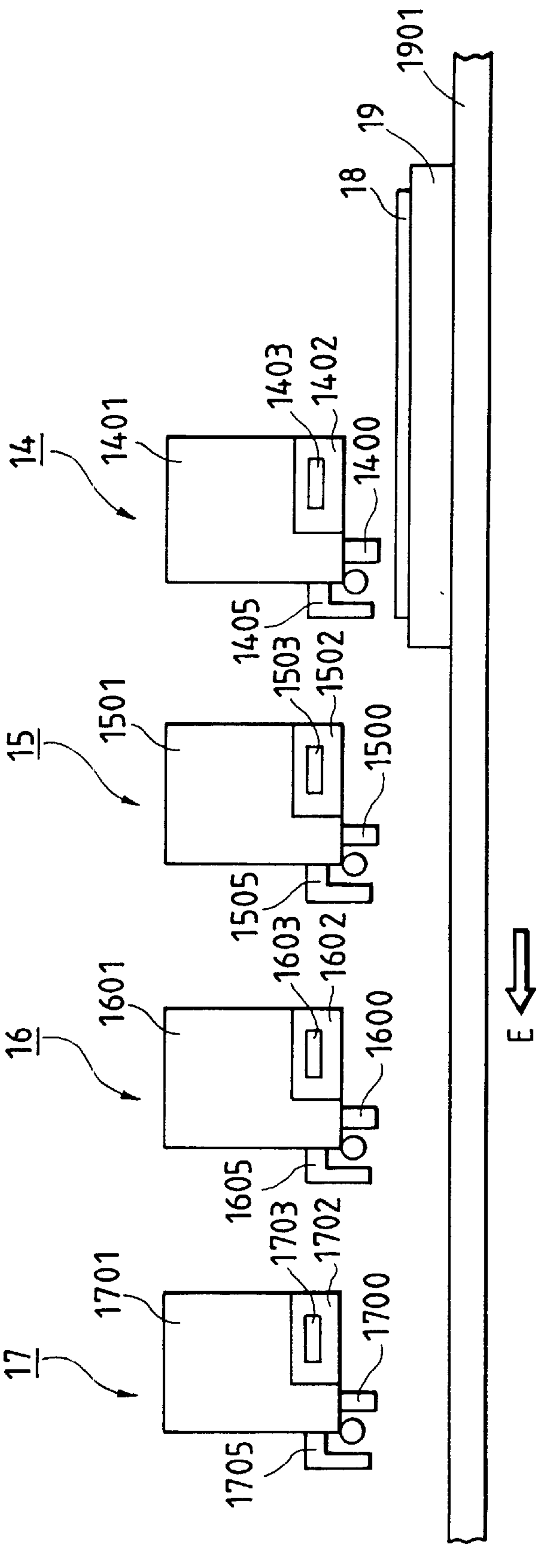
FIG. 16 illustrates still another embodiment of the ink-jet leather coloring apparatus used in Example 11 of the present invention.
Figure 17:
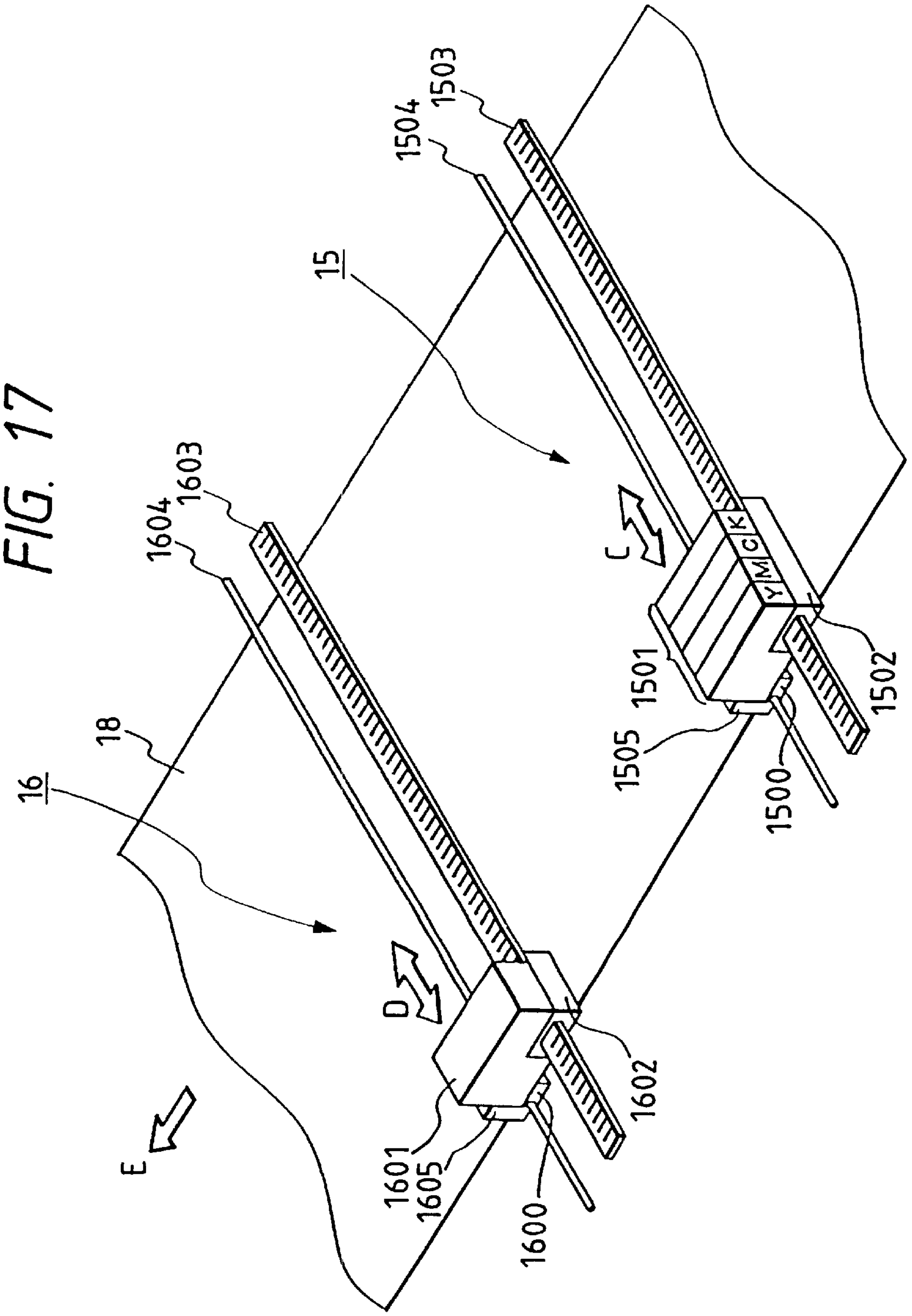
FIG. 17 illustrates the main constitution of ink-jet means in the ink-jet leather coloring apparatus shown in FIG. 16.

FIG. 16 illustrates the whole constitution of a leather coloring apparatus according to another mode of the third embodiment of the present invention. FIG. 17 illustrates the main part of ink-jet recording means in FIG. 16. In this mode, in contrast to the mode of Example 10, inks are jetted in perpendicularly downward direction and the leather is transported in one direction so that the operation can be simplified. In this leather coloring apparatus, the step of coloring with ink is carried out by an ink-jet means 15, and the steps prior and posterior to the leather coloring are carried out by an ink-jet recording means 14 and an ink-jet means 16. The modifying step is also carried out by an ink-jet means 17. The whole of the apparatus is constituted in this way. To describe how to operate this leather coloring apparatus, the main operation according to ink-jet system will be first described with reference to FIG. 17.

FIG. 17 shows, in the whole constitution of the above leather coloring apparatus, the portions corresponding to the ink-jet means 15 and ink-jet means 16 where the leather coloring step and the posterior step are carried out. These ink-jet means are operated basically in the same manner as described in Example 11. In the ink-jet means 15 provided here, an ink-jet head 1500 from which coloring inks are jetted is comprised of ink-jet head units arranged in four sets, provided with a plurality of nozzles in order. The ink-jet head 1500 is also joined with an auxiliary ink tank 1501 temporarily holding inks, where the inks have been fed. The inside of the auxiliary ink tank 1501 is partitioned into chambers so as to be respectively filled with black, cyan, magenta and yellow the four color inks so that inks can be color-by-color fed to the four ink-jet head units. The respective color inks are also fed through tubes (not shown) from an ink feed device separately provided, to the respective chambers thus partitioned. Symbols marked with K, C, M, Y, on the auxiliary ink tank 1501 represent black, cyan, magenta and yellow, respectively. These ink-jet head 1500 and auxiliary ink tank 1501 are both provided on a carriage 1502. According to signals sent from a transmitter (not shown) to the ink-jet head 1500, the carriage 1502 is reciprocatingly moved to scan in the directions of arrows C shown in the drawing, along a guide rail 1503 and a guide rail 1504, and at the same time the downward jetting of inks from the ink-jet head 1500 in accordance with image signals is started, and thus coloring can be made on a leather 18. Then, every time the carriage 1502 is reciprocatingly moved, the leather 18 is successively transported in the direction of an arrow E until the coloring is made on the whole surface.

When the leather coloring is carried out on the leather 18 at the part of the ink-jet means 15 described above, the area to which inks are to be jetted can be in variety within the range every time the carriage 1502 is reciprocatingly moved, since leathers are originally not in standard size. As a measure therefor, the area to be ink-jetted from the ink-jet head may be beforehand set to a maximum ink-jetting area on the leather 18. In such a measure, however, inks may be jetted also to the part outside the leather 18, resulting in a waste of inks. In the ink-jet means shown in FIG. 17, in order to prevent such waste of inks, a leather detecting means 1505 for detecting the presence of leather is provided in the vicinity of the ink-jet head 1500. Detection outputs and ink-jet head drive signals are synchronized so that the jetting of inks can be stopped when the ink-jet head 1500 scans the part outside the leather 18. Here, this leather detecting means 1505 makes use of a reflection photo-interrupter. This leather detecting means 1505 also need not be provided with any special mechanism. Besides such means, a method in which various types of light-emitting device and light-receiving device are used in combination and a method in which ends of leather are detected by the touch of a touch needle under a slight force to recognize the area the leather 18 is present are available.

Meanwhile, with reference to FIG. 16, an ink-jet means 16 for carrying out the step posterior to the ink-jet leather coloring, i.e., for jetting an image controlling agent solution is provided in parallel to the reciprocating movement of the above carriage 1502 and on the upstream side in the direction of the transport of the leather 18. Again with reference to FIG. 17, in the ink-jet means 16, an ink-jet head 1600 from which the image fixing agent is jetted is comprised of one ink-jet head unit having a plurality of nozzles arranged in rows. This ink-jet head 1600 is joined with an auxiliary treating solution tank 1601 temporarily holding the image fixer, where the image controlling agent has been fed. This auxiliary treating solution tank 1601 is so designed that the image controlling agent can be fed thereto through a tube (not shown) from a treating solution feed devise separately provided. This ink-jet means 16 is operated so as to apply the posterior step treatment by the image controlling agent, to the leather 18 on which the leather coloring has been made by the ink-jet means 15 previously described. These ink-jet head 1600 and auxiliary treating solution tank 1601 are both provided on a carriage 1602. According to signals sent from a transmitter (not shown) to the ink-jet head 1600, the carriage 1602 is reciprocatingly moved to scan in the directions of arrows D shown in the drawing, along a guide rail 1603 and a guide rail 1604, and at the same time the image controlling agent is downward jetted from all nozzles of the ink-jet head 1600, and thus the directly posterior step treatment is applied to the leather 18 right after the leather coloring. Then, every time the carriage is reciprocatingly moved, the leather 18 is successively transported in the direction of the arrow E until the directly posterior step treatment is carried out on the whole surface. In order to detect the area in which the leather 18 is present, a leather detecting means 1605 comprised of a reflection photo-interrupter is also provided in the vicinity of the ink-jet head 1600. Thus, the image controlling agent is controlled to be jetted only to the part where the leather is present.

The ink-jet means 14 for jetting the ink permeation controlling agent and the ink-jet means 17 for jetting a finishing coating material are operated in the same way as the ink-jet means 16, and description thereon is omitted here.

Again with reference to FIG. 16, the means for transporting the leather 18 has a mechanism as described below. That is, the transport means has an attraction device 19 for attracting the leather 18 on the side of the non-coloring surface by suction of air. This attraction device 19 has a mechanism that is moved along a rail 1901 in the direction corresponding to a direction E in FIG. 17. To start the operation of leather coloring, the leather 18 is first put on the attraction device 19, and then the air suction is made for a certain time through a drive source (not shown) to firmly attach the leather by suction and at the same time make it flat. Next, the attraction device 19 is forwarded in the direction of the arrow E until the forward end of the leather 18 approaches the ink-jet head 1400, where the operation of leather coloring is started. Thereafter, every time the carriage 1502 is reciprocated once, the leather 18 set on the attraction device 19 is successively forwarded in the direction of the arrow E by the coloring width of the ink-jet head 1400. The leather 18 is further forwarded at the same speed and approaches the ink-jet head 1500. Then the coating described above is successively carried out. After the coating on the leather 18 has been completed, the attraction of the leather 18 is released to complete the operation.

The use of the apparatus having such constitution makes it possible to accomplish the leather coloring apparatus comprising the prior step, the coloring step, the posterior step and the modifying step all of which are made continuous for treating the leather. Both the prior step and the posterior step require only a relatively short time between these and the coloring step, and hence they can be set up as the directly prior step and the directly posterior step of the coloring step. Moreover, in the case of this leather coloring apparatus, the leather can be set on with ease and the transport path is on a straight line, so that the mechanism for transport can also be simplified. Hence, the coloring on the leather can be more efficiently automated. In addition to these advantages, in this apparatus, the distance at which the respective ink-jet means are set up may be made freely changeable, whereby the time for the drying carried out after the leather coloring or modifying including its pre- and post treatment steps can be arbitrarily set in accordance with such distance. This makes it possible to more greatly expand the scope of application of inks used and the composition or jetting quantity of various treating solutions.

EXAMPLE 12

Figure 18:
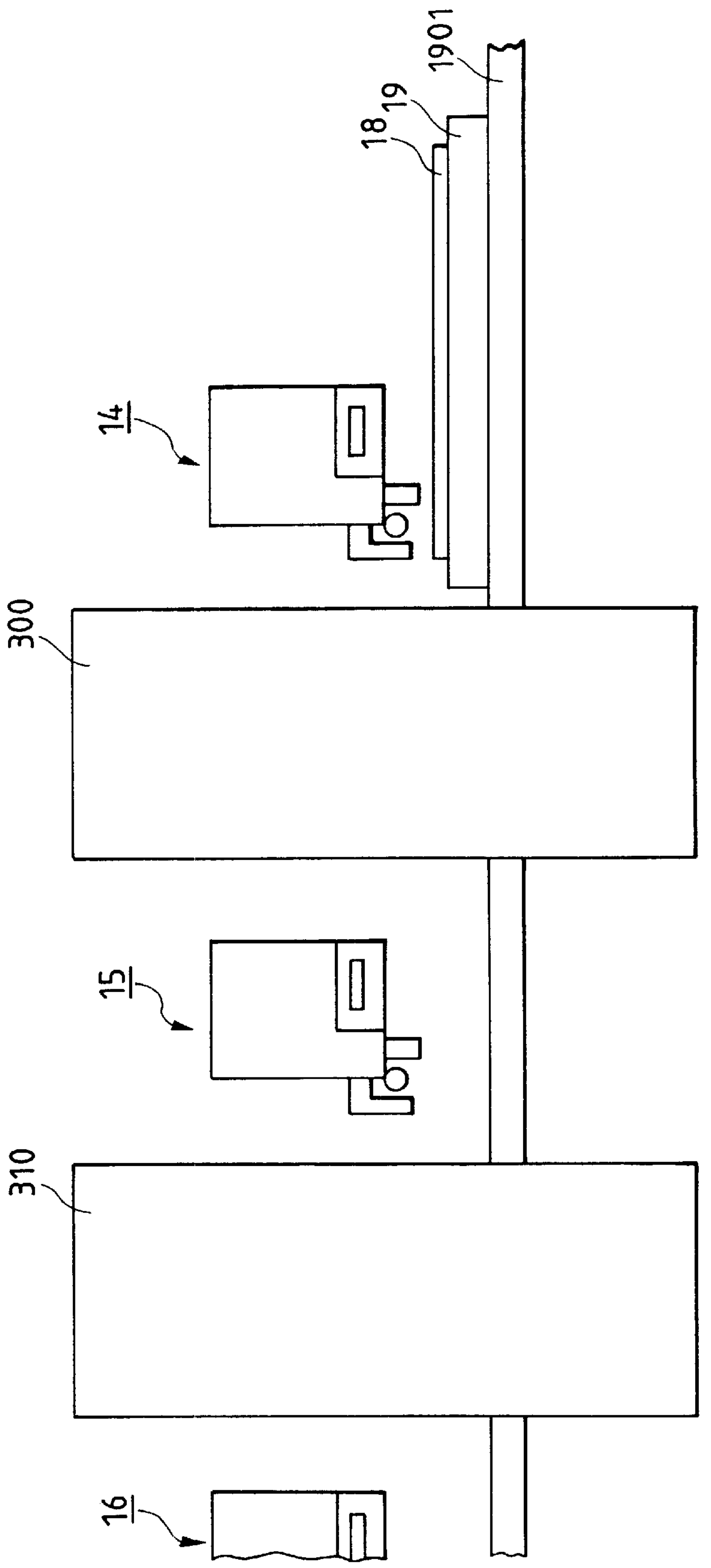
FIG. 18 illustrates a further embodiment of the ink-jet leather coloring apparatus used in Example 12 of the present invention.

FIG. 18 shows a more advanced embodiment of the mode in Example 11, and illustrates the whole constitution of such an ink-jet leather coloring apparatus. Ink-jet means provided in this example are the same as the ink-jet means 14, 15, 16 and 17 described in Example 11. In the present Example, the ink-jet means arranged in a straight line are respectively provided, at their delivery sides, with drying devices 300 and 310. The drying device is also similarly provided on every delivery side of the ink-jet means 16 and the ink-jet means 17 each, which are omitted in FIG. 18. When such drying devices are provided, the leather 18 enters the respective drying devices directly after the coloring step including the prior and posterior steps or the modifying step, and the solvent components of the respective treating solutions jetted are compulsorily evaporated so that the time before the subsequent treatment can be made short. This makes it possible to shorten the time for each treatment and reduce the size of the whole ink-jet leather coloring apparatus.

Leathers are commonly not so resistant to high temperatures, depending on the kinds of animals or tanning methods. Hence, the temperature in these drying devices need not be so high. The temperature may preferably be 60° C. or below, which is also the temperature set in usual fatliquoring. Also, at the temperature of such a degree, it may be impossible to instantaneously dry the leather, and thus it is effective for the ink-jet leather coloring apparatus shown in FIG. 18 to make control so that the movement of the suction device 19 is stopped at the time the leather 18 has been transferred into the drying device 300 or 310 to thereby stay the leather 18 in the drying device 300 or 310 for a given time to well dry the leather. In such a case, the apparatus is controlled in the manner that the operation of the ink-jet means is also stopped in synchronization with the above stop.

EXAMPLE 13

Figure 19:
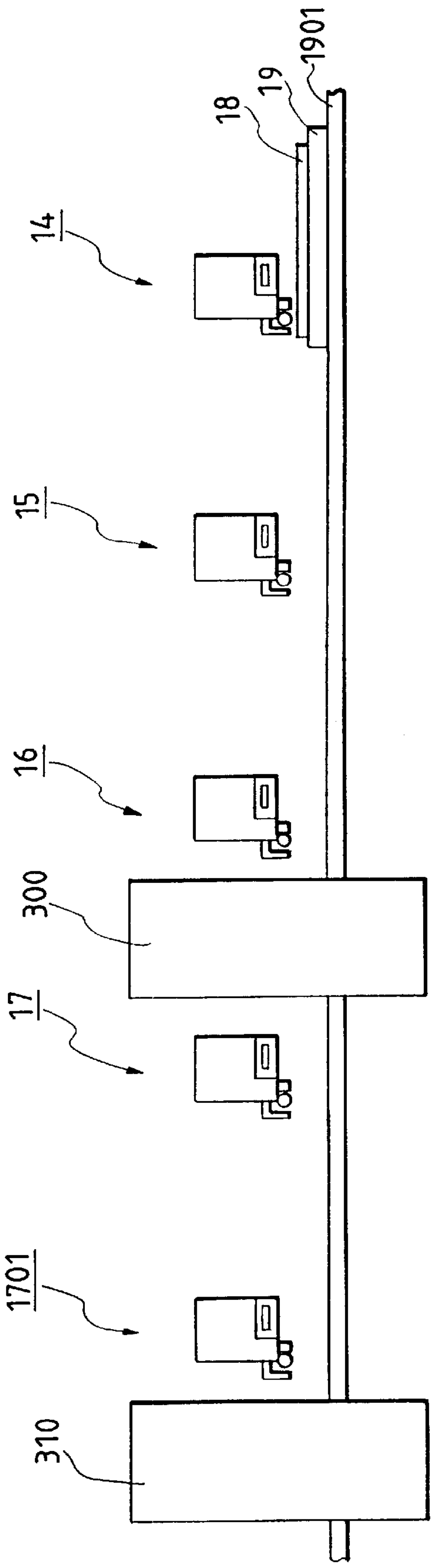
FIG. 19 illustrates a still further embodiment of the ink-jet leather coloring apparatus used in Example 13 of the present invention.

FIG. 19 shows still another mode of the third embodiment of the present invention, in which, in the ink-jet leather coloring apparatus shown in FIG. 16, the drying devices are provided only at the stages before the modifying step and after the modifying step. In the leather coloring step having the prior step and the posterior step, the treating solution is naturally not added to the leather 18 in excess, and hence the drying is not always necessary for each of these individual steps. Similarly, the finishing coating material in the modifying step also need not be used in excess in order to maintain the handle, the important properties of leather, and hence, the drying is not always necessary also in the modifying step.

On the other hand, when the drying device 300 is provided at the stage after the posterior step of the leather coloring and before the modifying step, the action of heating rather than the action of drying is applied to the leather at this part. This can more readily strengthen the bond between the coloring material in the colored leather 18 and the leather itself. After the modifying step also, the fixing performance of the finishing coating material to the leather 18 can be more improved when the drying device 310 is provided. Because of such constitution, the images colored can be prevented from deteriorating.

Taking the constitution as described above has made it possible to form stable images and achieve fastness of more firm images and also on leathers having relatively few dyeing sites. It is also easy to handle leathers in the leather coloring, and also rapidly carry out coloring on leathers.

The above Examples 10 to 13 are all described as methods where the whole surface of leather is treated for each step when the coloring is carried out on the leather. In the leather coloring process of the present invention, the methods are by no means limited to these, and at least the area to be colored on the leather may be treated in the order of the steps described above. In other words, as viewed on any desired area on the leather, the area may be treated in the order of the prior step using the ink permeation controlling agent, the ink-jet leather coloring step, the posterior step using the image controlling agent and the modifying step. Thus, the third embodiment and the fourth embodiment may also include the constitution such that, when treated by causing the ink-jet means to scan over a sheet of leather, the ink-jet means which successively jet the respective treating solutions are arranged in a row and the coloring on the whole surface of the leather is completed while the treating solutions in the respective steps are successively imparted.

As described above, according to Examples 10 to 13, the ink permeation controlling agent is imparted as the prior step of the leather coloring step and the image controlling agent is imparted as the posterior step when images are formed on leather by making a print on the leather by the ink-jet means, whereby the images formed on the leather can be made to have a higher minuteness and a better color forming performance, and have superior fastness to achieve the second object of the specified technical subject mentioned above.

In addition, among conventional manners of treatment on leathers, the inventors took note of the treatment not mainly intended for changing the physical properties of leather itself, i.e., the dyeing and the finishing coating, reconsidered the procedure of treatment starting from treatment on raw hide or skin, and have discovered that it brings about efficient manufacture of leather products to carry out the finishing coating by also using the ink-jet means. As a result, the modifying step typified by the finishing coating can be made substantially continuous to the step of the leather coloring to achieve the third object of the specified technical subject mentioned above.

Through combining such treating steps, it has become further possible to form images on leathers with a good efficiency and also to automate the steps up to the finishing. Such combinations of the treating steps have also brought about the advantages that the treatment on many kinds of hides and skins in small quantities and the representation of multi-color and highly minute images can be achieved as a matter of course, and also the problem of disposal of excess treating solutions can be settled.

Thus, leather products with a high image quality and a high product quality can be obtained without any limitations on the uses of conventional leathers and without any great increase in production cost and waste of time.

What is claimed is:

1. A leather coloring apparatus comprising a means for changing a quantity of ink, when ink-jetted according to coloring signals, in accordance with a type of a natural leather to be subjected to leather coloring; an ink-jet means; and a transport means for transporting the natural leather to a coloring zone of the ink-jet means in a state of non-contact with the ink-jet means.

2. A leather coloring apparatus comprising a host computer which outputs multi-color information necessary for leather coloring on a natural leather; a multi-color ink-jet means; a means for changing a quantity of ink, when ink-jetted according to multi-color coloring signals, in accordance with a type of a natural leather to be subjected to leather coloring; and a transport means for transporting the natural leather to a coloring zone of the ink-jet means in a state of non-contact with the ink-jet means.

3. A leather coloring apparatus for coloring a leather, comprising:

a liquid ink containing a coloring material;

a coloring material fixing agent reacting with coloring material when it contacts with the ink on a leather, and penetrating into the leather;

an ink-jet means for applying the liquid ink in a form of droplets corresponding with given information; and a means for imparting the coloring material fixing agent to said leather.

4. A leather coloring apparatus which forms an image on a leather by coloring, comprising:

an ink containing coloring material;

an image forming ink-jet means for jetting the ink on a leather to form an image on the leather; and modifying means for imparting to the leather an image modifying agent and forming a finishing coating on the image formed by the image forming ink-jet means.

5. The leather coloring apparatus according to claim 4, further comprising:

an ink permeation controlling agent;

a first ink-jet means for jetting the ink permeation controlling agent;

an image controlling agent; and a second ink-jet means for jetting the image controlling agent, and wherein the modifying means for imparting an image modifying agent comprises the image modifying agent and a third ink-jet means for jetting the image modifying agent.

6. The leather coloring apparatus according to claim 5, wherein the first ink-jet means for jetting the ink permeation controlling agent, the image forming ink-jet means for jetting the ink, the second ink-jet means for jetting the image controlling agent, and the third inkjet means for jetting the image modifying agent are disposed so that ink permeation controlling agent, the ink, the image controlling agent and the image modifying agent are applied to the leather in this order.

* * * * *

CERTIFICATE OF CORRECTION

PATENT NO. : 6,357,845 B1
APPLICATION NO. : 09/310129
DATED : March 19, 2002
INVENTOR(S) : Nobuyuki Kuwabara et al.

It is certified that error appears in the above-identified patent and that said Letters Patent is hereby corrected as shown below:

ON THE TITLE PAGE ITEM [56], REFERENCES CITED:

U.S. Patent Documents, Insert --08/420,769, "Ink-jet printing cloth, printing process using the same and print obtained by the process", Kuwabara et al., 4/12/95 ABDN
08/635,335, "Liquid composition and ink jet, and image-forming process and apparatus using the same", Kurabayashi et al., 4/19/96, pending
08/863,719, "Recording medium and image-forming method employing the same", Sakaki et al., 5/27/97, pending--.

SHEET 1:

Figure 1, "BEAMHAUSE" should read --BEAMHOUSE--.

Figure 8:
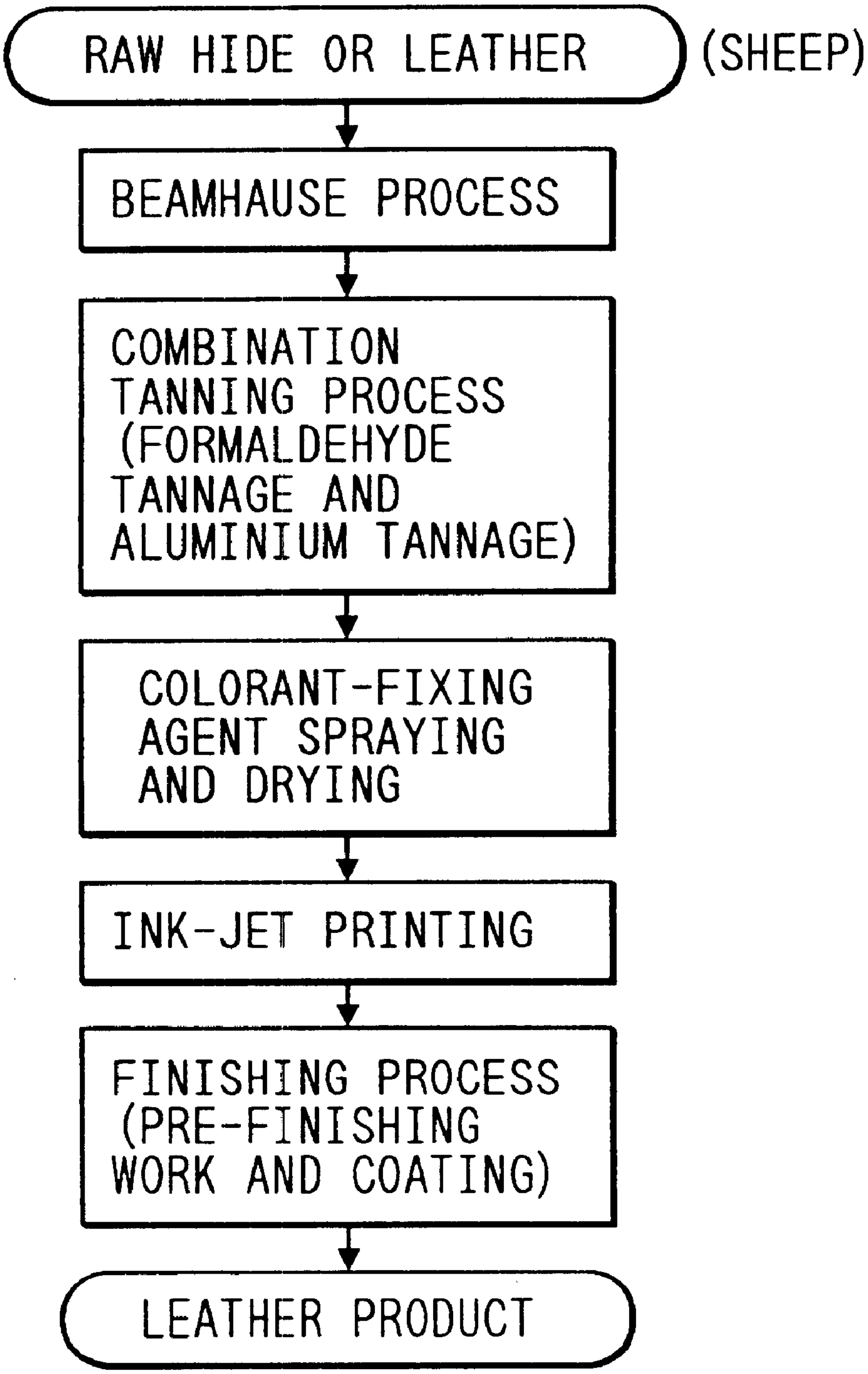
FIG. 8 is a flow chart of a leather coloring process in Example 5 of the present invention.

SHEET 7:

Figure 8, "BEAMHAUSE" should read --BEAMHOUSE--.

SHEET 10:

Figure 12, "BEAMHAUSE" should read --BEAMHOUSE--.

COLUMN 1:

Line 12, "a" ($2^{nd}$ occurrence) should be deleted;
Line 28, "bating" should read --bathing--;
Line 29, "subsequently" should read --subsequent--;
Line 43, "footware" should read --footwear--; and
Line 64 "battick" should read --batik--.

COLUMN 2:

Line 14, "smoothened" should read --smoothed--; and
Line 45, "which," should read --which--.

UNITED STATES PATENT AND TRADEMARK OFFICE

CERTIFICATE OF CORRECTION

PATENT NO. : 6,357,845 B1
APPLICATION NO. : 09/310129
DATED : March 19, 2002
INVENTOR(S) : Nobuyuki Kuwabara et al.

It is certified that error appears in the above-identified patent and that said Letters Patent is hereby corrected as shown below:

COLUMN 3:

Line 11, "high" should read --highly--;
Line 39, "hinderance" should read --hindrance--;
Line 50, "a" should be deleted;
Line 52, "hitherfrom" should read --therefrom--; and
Line 58, "of area or" should read --or area of--.

COLUMN 4:

Line 9, "a" should be deleted;
Line 16, "loosing" should read --losing--;
Line 25, "subject" should read --subjects--;
Line 39, "proceeded," should read --advanced,--
Line 39, "to require man power" should read --that require manpower--;
Line 43, "a" should be deleted;
Line 52, "cannot" should read --is not--;
Line 53, "be" should be deleted;
Line 54, "hinderance" should read --hindrance--;
Line 58, "problems" should be deleted;
Line 64, "water" should read --high level of water--; and
Line 65, "high" should read --highly--.

COLUMN 5:

Line 19, "a" should be deleted.

COLUMN 11:

Line 47, "First," should read --first,--; and
Line 48, "dirts," should read --dirt,--.

COLUMN 13:

Line 12, "Ltd.," should read --Ltd.;--.

UNITED STATES PATENT AND TRADEMARK OFFICE
CERTIFICATE OF CORRECTION

PATENT NO. : 6,357,845 B1
APPLICATION NO. : 09/310129
DATED : March 19, 2002
INVENTOR(S) : Nobuyuki Kuwabara et al.

It is certified that error appears in the above-identified patent and that said Letters Patent is hereby corrected as shown below:

COLUMN 15:

Line 4, "them" should read --it--;
Line 35, "form" should read --from--;
Line 40, "connection" should read --connections--; and
Line 57, "ten" should read --tens of--.

COLUMN 17:

Line 56, "treatment), carrier out" should read --treatment) carried out--.

COLUMN 19:

Line 14, "have had a" should read --has had--.

COLUMN 21:

Line 20, "not a little effects" should read --considerable effects--.

COLUMN 22:

Line 20, "is provided." should read --as provided.--.

COLUMN 23:

Line 36, "crocking" should read --cracking--; and
Line 53, "amides" should read --amide--.

COLUMN 24:

Line 22, "an other" should read --another--.

COLUMN 25:

Line 47, "was" should read --were--; and
Line 48, "treatment before" should read --before treatment--.

UNITED STATES PATENT AND TRADEMARK OFFICE

CERTIFICATE OF CORRECTION

PATENT NO. : 6,357,845 B1
APPLICATION NO. : 09/310129
DATED : March 19, 2002
INVENTOR(S) : Nobuyuki Kuwabara et al.

It is certified that error appears in the above-identified patent and that said Letters Patent is hereby corrected as shown below:

COLUMN 31:

Line 40, “realized to provide” should read --resulted in providing--.

COLUMN 33:

Line 32, “used” should read --use--.

COLUMN 34:

Line 67, “well function.” should read --function well.--.

COLUMN 40:

Line 45, “state” should read --state where--.

COLUMN 41:

Line 17, “dried.” should read --being dried.--; and
Line 62, “well” should read --very--.

COLUMN 45:

Line 59, “more greatly” should read --further--.

Signed and Sealed this

Twenty-sixth Day of August, 2008

JON W. DUDAS
*Director of the United States Patent and Trademark Office*